United States Patent
Aziz et al.

(10) Patent No.: US 11,477,004 B1
(45) Date of Patent: Oct. 18, 2022

(54) CLOCK DATA RECOVERY CONVERGENCE IN MODULATED PARTIAL RESPONSE SYSTEMS

(71) Applicant: NVIDIA Corp., Santa Clara, CA (US)

(72) Inventors: Pervez Mirza Aziz, Dallas, TX (US); Vishnu Balan, Saratoga, CA (US); Viswanath Annampedu, Plano, TX (US)

(73) Assignee: NVIDIA CORP., Santa Clara, CA (US)

( * ) Notice: Subject to any disclaimer, the term of this patent is extended or adjusted under 35 U.S.C. 154(b) by 0 days.

(21) Appl. No.: 17/379,732

(22) Filed: Jul. 19, 2021

Related U.S. Application Data

(60) Provisional application No. 63/164,891, filed on Mar. 23, 2021.

(51) Int. Cl.
*H04L 25/49* (2006.01)
*H04L 7/00* (2006.01)

(52) U.S. Cl.
CPC .......... *H04L 7/0054* (2013.01); *H04L 7/0016* (2013.01)

(58) Field of Classification Search
CPC ... H04L 7/0054; H04L 7/0062; H04L 27/367; H04L 7/0331; H04L 7/0334; H04L 25/063; H03L 7/091; H03L 7/146
USPC ....... 375/293, 294, 287, 290, 291, 375, 373, 375/371
See application file for complete search history.

(56) References Cited

U.S. PATENT DOCUMENTS

| | | | |
|---|---|---|---|
| 8,120,407 B1 | 2/2012 | Ooi et al. | |
| 8,860,467 B2 | 10/2014 | Malipatil et al. | |
| 9,197,396 B1 | 11/2015 | Srinivasa | |
| 9,374,250 B1 | 6/2016 | Musah et al. | |
| 9,882,703 B1 | 1/2018 | Xu et al. | |
| 10,355,889 B1 | 7/2019 | Huss et al. | |
| 10,700,846 B1 | 6/2020 | Aziz et al. | |
| 11,212,073 B2 * | 12/2021 | Aziz | H04L 7/0062 |
| 2002/0114616 A1 | 8/2002 | Okamoto | |
| 2002/0196510 A1 * | 12/2002 | Hietala | H04L 27/367 398/202 |
| 2005/0058234 A1 * | 3/2005 | Stojanovic | H04L 7/0331 375/371 |
| 2006/0062341 A1 | 3/2006 | Edmondson et al. | |
| 2006/0233291 A1 * | 10/2006 | Garlepp | H04L 25/063 375/355 |
| 2013/0148712 A1 | 6/2013 | Malipatil et al. | |
| 2013/0243127 A1 | 9/2013 | Chmelar et al. | |
| 2016/0173271 A1 | 6/2016 | Kou | |
| 2018/0241540 A1 * | 8/2018 | Shibasaki | H04L 7/0334 |
| 2018/0262373 A1 * | 9/2018 | Shibasaki | H04L 7/0334 |

(Continued)

OTHER PUBLICATIONS

U.S. Appl. No. 16/386,029_USPTONonFinalRejection_dated Feb. 21, 2020.

(Continued)

*Primary Examiner* — Phuong Phu
(74) *Attorney, Agent, or Firm* — Rowan TELS LLC

(57) ABSTRACT

A clock data recovery circuit detects illegal decisions for received data, accumulates a phase gradient for the data, determines a number of the illegal decisions in a configured window for receiving the data, and if the number of the illegal decisions exceeds a pre-defend number in the window, applies a sum of the accumulated phase gradient and a phase increment having a sign of the accumulated phase gradient to a clock circuit for the data receiver.

21 Claims, 18 Drawing Sheets

(56) References Cited

U.S. PATENT DOCUMENTS

| | | |
|---|---|---|
| 2018/0278405 A1 | 9/2018 | Yao et al. |
| 2018/0316356 A1 | 11/2018 | Moballegh et al. |
| 2020/0336286 A1 | 10/2020 | Aziz et al. |
| 2021/0067312 A1* | 3/2021 | Kawasoe ................. H03L 7/091 |
| 2021/0328592 A1* | 10/2021 | Chen ....................... H03L 7/146 |

OTHER PUBLICATIONS

U.S. Appl. No. 16/802,437_USPTOFinalRejection_dated Aug. 25, 2021.
U.S. Appl. No. 16/802,437_USPTONonFinalRejection_dated Mar. 18, 2021.
J.D. Alexander, "Clock Recovery From Random Binary Signals", IEE Electronics Letters, 1975, vol. 11 No. 22.
R. Cideciyan et al., "A PRML system for digital magnetic recording," IEEE J. Select. Areas Common., vol. 10, pp. 38-55, Jan. 1992.

\* cited by examiner

CLOCK DATA RECOVERY CONVERGENCE IN MODULATED PARTIAL RESPONSE SYSTEMS

CROSS REFERENCE TO RELATED APPLICATIONS

This application claims priority and benefit under 35 USC 119(e) to U.S. application Ser. No. 63/164,891, "Method and Apparatus to Improve Clock Data Recovery (CDR) Convergence In PAM4 Modulated Partial Response Systems Using Illegal Data Detection Driven Phase Adjustments", filed on Mar. 23, 2021, the contents of which are incorporated herein by reference in their entirety.

BACKGROUND

The transmission of pulse amplitude modulated (PAM) data through a data channel introduces inter-symbol interference (ISI) to the transmitted data at the channel output. For a non-return to zero (NRZ) based PAM transceiver the transmitted data comprises symbols −1 and 1 with each symbol value representing a binary bit. This is also known as a 2-level PAM (PAM-2) system because there are two unique values of transmitted symbols. Typically a binary bit 0 is represented as −1 and a bit 1 is encoded as 1 as the PAM-2 values.

The state of the art in many communication channels utilizes the use of four unique values of transmitted symbols (PAM-4) to achieve higher efficiency and performance. These four levels are typically denoted by symbol values of −3, −1, +1, +3 with each symbol representing a corresponding unique combination two binary bits.

In addition to mitigating the effects of inter-symbol interference (ISI) or other impairments, a PAM-4 receiver utilizes a clock and data recovery (CDR) circuit to sample the signal at a desirable sampling phase before the sampled data is detected. A typical CDR is a feedback or control system comprising (1) a phase detector to convert received amplitude information to an estimate of the error in sampling time/phase present at the current sampling phase (2) a loop filter that filters unwanted noise/jitter present in the phase detector estimate, and (3) a timing adjustment mechanism which takes the loop filter output and adjusts the sampling phase of the receiver. Examples of timing adjustment elements are phase interpolators, voltage controlled oscillators (VCO), phase mixers, or some combination thereof of these example elements.

The phase detector is also known as a gradient calculator which drives the CDR control loop. The phase detector could an oversampled phase detector such a bang-bang or Alexander phase detector or a baud rate phase detector. An oversampled phase detector uses sampled data in addition to the main CDR sampled data, for example, the typical BBPD uses data sampled at 0.5 unit intervals (UI) offset from the main CDR sampled data. A baud rate phase detector uses only the main CDR sampled data. Although for the purposes of this invention any type of phase detector may be utilized, the following examples focus on use of a a baud rate CDR. A CDR loop filter is typically a second order proportional/integral loop.

Being a feedback control system, a CDR has a finite convergence or settling time. Also because the CDR operates on decisions from the data detector, errors in the data decisions may impact the effectiveness of the CDR convergence. This will be particularly the case if the initial sampling phase of the receiver happens to be at or close to the edge i.e. 0.5 clock periods T away, from the correct or optimal sampling phase in the center of the received bit signal. In such a scenario, the convergence time may be especially longer than if the initial sampling phase were closer to the optimal sampling phase. In addition, for a PAM-4 receivers the challenge becomes more significant because the quality of the data decisions may be poor even for sampling phases which are not fully 0.5 T away from the optimal sampling phase. In particular, the CDR may actually lock to an incorrect phase for PAM-4 systems.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

Embodiments of a method and apparatus are disclosed to improve the convergence of a CDR in such a scenario, particularly for PAM-4 transceivers. It will be appreciated that algorithms to implement the method and apparatus may be expressed in concise format as equations in some cases. The logic to implement these equations in hardware, software, or combinations thereof will be readily apparent to those of ordinary skill in the art in view of this disclosure.

The disclosed techniques utilize circuitry to detect pathological errors symptomatic of severe timing errors in a partial response system. When such errors are detected, an additional compensation is injected or added to the CDR timing estimate. The increment may be injected or added to the phase detector output (gradient) or other points in the CDR signaling path. The sign of the increment is determined by examining the sign or direction of an accumulated version of the CDR gradient value from the past. The error detection mechanism may be subject to various constraints such as requiring the number of errors to exceed a threshold over a given window, and the gradient injection increment may be programmable (adjustable at runtime and/or post-manufacture). The CDR phase compensation mechanism accelerates and thus improves the overall convergence of the CDR while enabling it to reach the correct sampling phase instead of locking to an incorrect phase which has a higher probability to occur when utilizing PAM-4 signaling.

The detection logic may be implemented in an all-digital circuit and comprises a set of conditions on the current detected data sample and the prior detected data sample. As such, it may be implemented with a look up table (LUT).

An all digital solution is readily implemented with conventional digital logic blocks and RTL code. It does not rely on the presence of a preamble sequence in the transmitted data in order to properly operate. Both the error detector and the injection mechanism may be implemented digitally. This also enables for readily programmable features to control the behavior of the circuit. Embodiments of algorithms are disclosed for a 1+D partial response (PR1) and a $1+2D+D^2$ partial response (PR2) PAM-4 system.

Figure 1:
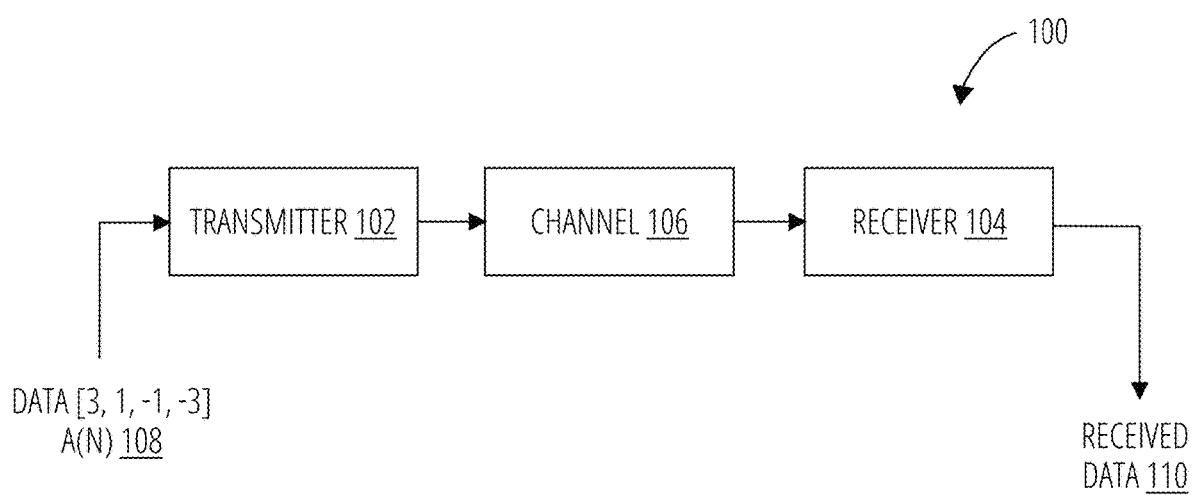
FIG. 1 depicts a transceiver 100 in accordance with one embodiment.

FIG. 1 depicts a transceiver 100 according to some embodiments. The transceiver 100 includes a transmitter 102 to transmit data, a receiver 104 and a communication channel 106, e.g., a medium, through which the data is transmitted from the transmitter 102 to the receiver 104. In general, the basic purpose of a transceiver 100 is to transmit data from a source, e.g., a transmitter 102, to a destination, e.g., a receiver 104. For a PAM-4 system, the data takes the form of symbols (four distinct voltage levels) represented as 3, 1, −1, and 3 (for example).

The data being transmitted by the transmitter 102, e.g., transmitted data 108, may be received, e.g., received data 110, by the receiver 104 which is located at some point away from the transmitter 102. In various embodiments, the transmitter 102 processes the data, e.g., signal, into a form suitable for transmission over the communication channel 106. The job of receiver is to process the received data 110 to recover the appropriate message signal. If the different elements do their tasks accordingly, the received data 110 and the transmitted data 108 should ideally be identical, although in fact some mismatches will occur, resulting in a data error rate. Generally, there are two types of data transmission: analog and digital. Digital data communication systems have advantages such as: 1—increased immunity to noise in the channel and outside interference, 2—more flexible operation, 3—possibility of transmitting different types of data, e.g., voice, video, etc. in the same format, and 4—possibility of encrypting the data to provide security for sensitive data.

Once the transmitted data passes through the transmission channel 106, the receiver 104 processes the channel output using an "equalizer" to mitigate the effects of inter-symbol interference (ISI) as well as to enable sampling of the channel output at desirable time instances to properly detect the received data 110 such that the recovered data is error free. Examples of equalizers are continuous time linear equalizer (CTLE), sampled data finite impulse response (FIR) filter also known as a RX feed forward equalizer (RXFFE), or decision feedback equalizer (DFE). One or more of these equalizers may be optionally used in a practical system. A data detector makes a decision to produce detected data bits or symbols. An example of a data detector could be a simple latch or slicer which slices a voltage at a programmable threshold or an analog to digital converter (ADC) which produces a multi-bit output from which the data can be detected and from which an estimate of the error in the detected data can also be computed.

Figure 2:
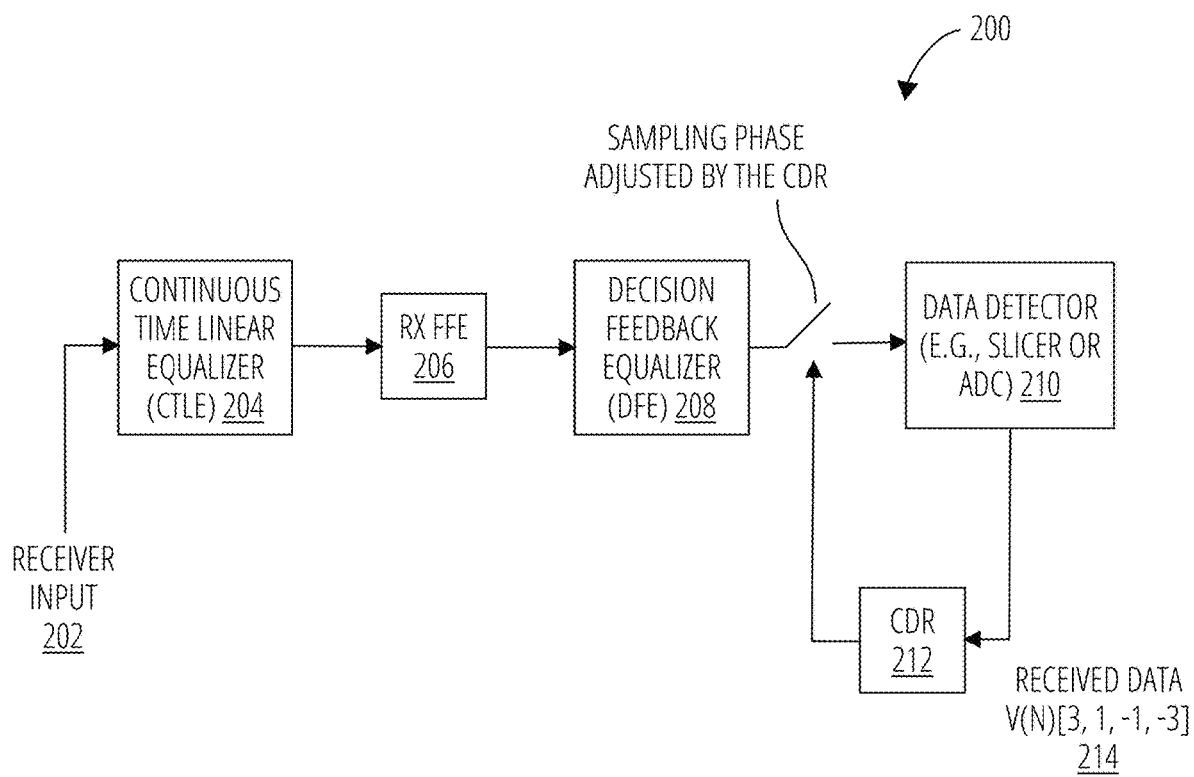
FIG. 2 depicts a receiver 200 in accordance with one embodiment.

FIG. 2 depicts a receiver 200 according to some embodiments. The receiver 200 includes receiver input 202, a continuous time linear equalizer 204, a receiver feed forward equalizer (feed forward equalizer 206), a decision feedback equalizer 208, a data detector 210 and a clock and data recovery, clock and data recovery circuit 212. In various embodiments, transmission of data through the communication channel introduces inter-symbol interference to the transmitted data at the channel output. Therefore, the receiver must process the channel output using an equalizer to mitigate the effects of the inter-symbol interference. In digital communication, inter-symbol interference is a form of distortion of a data in which one symbol interferes with subsequent symbols. This undesired phenomenon has similar effect as noise, and has an adverse effect on the communication reliability. The inter-symbol interference may be caused by multipath propagation. Multipath propagation occurs when a wireless data from a transmitter reaches the receiver via multiple paths. The multipaths propagation may take place by reflection through bouncing off buildings, refraction through foliage of a tree, and atmospheric effects such as atmospheric ducting and ionospheric reflection. Another cause of inter-symbol interference is the transmission of a signal through a bandlimited channel. In bandlimited channels, the gain of the channel decreases at higher frequencies. Above a certain frequency, the frequency response may approach zero.

The equalizers may be applied to reduce inter-symbol interference and allow recovery of the transmitted symbol. In some embodiments, the receiver input 202 is first received by a continuous time linear equalizer 204. The continuous time linear equalizer 204 provides a high pass filter at the receiver 200 and endeavors to boost the higher frequencies at the receiver to bring all frequency components of the receiver input 202 to a similar amplitude. In various embodiments, equalizers are used to equalize the combined characteristics of the transmitter and channel.

In some embodiments, the continuous time linear equalizer 204 (CTLE) output enters a feed forward equalizer 206. The feed forward equalizer 206 (FFE) is a linear equalizer and is used to pre-compensate the channel distortion of a signal.

The data passes may be passed through a decision feedback equalizer 208 (DFE). The decision feedback equalizer 208 is a nonlinear equalizer to compensate some channel distortions without introducing noise amplification. In various embodiments, the decision feedback equalizer 208 uses previous data detector 210 decisions to eliminate the inter-symbol interference on pulses that are currently being demodulated. In other words, the distortion on a current pulse that was caused by previous pulses is subtracted. The nonlinearity of the decision feedback equalizer 208 stems from the nonlinear characteristic of the data detector that provides an input to the feedback filter.

A data detector 210 at the receiver generates detected data bits or symbols from the output of the equalizers. In some embodiments, the data detector is a simple latch or data slicer. A data slicer slices a voltage at a programmable threshold. In some embodiments, the data detector is an analog to digital converter (ADC). The ADC produces a multi-bit output from which the data may be detected and subsequently an estimate of the error in the detected data may also be computed.

The receiver samples the channel output at particular time instances to properly detect (e.g., slice) the received data without error. In some embodiments, the data detector 210 adjusts the sampling phase based on the clock and data recovery circuit 212 (CDR circuit) output.

In addition to mitigating the effects of inter-symbol interference or other impairments, according to some embodiments, the receiver uses a clock and data recovery system to sample the signal at a pre-determined sampling phase.

The receiver equalization and data detection may be implemented by a partial response system. A more complex implementation utilizes a maximum likelihood sequence detector, also known as a Viterbi detector. A Viterbi detector would typically be used in conjunction with a preceding analog to digital converter.

A partial response system such as depicted in FIG. 2 equalizes the received signal such that there may be a carefully controlled and a priori determined relationship between consecutive values of (a) equalized received symbols, and (b) the transmitted data. As a non-limiting example in a duobinary partial response system, the nominal relationship (assuming no other impairments and perfect equalization) between the transmitted data and the data slicer output in the receiver may be expressed by Equation 1, where y(n) is the data slicer output at symbol time n and a(n) and a(n−1) are the transmitted data bits at symbol times n and n−1 respectively. The data slicer output y(n) may be decoded into a final received estimate of the received data 214. In the absence of errors, v(n) may match a(n). For example in a duobinary i.e. PR1 system, the nominal relationship (assuming no other impairments and perfect equalization) between the transmitted data and the received slicer outputs is the following:

$$y(n)=a(n)+a(n-1) \qquad \text{Equation 1}$$

Here y(n) is the data slicer output at symbol time n and the a(n) and a(n−1) are the transmitted data bits at symbol times n and n−1 respectively. The data slicer output, y(n) is decoded into a final received data estimate of the transmitted data, v(n) which in the absence of impairments should match a(n).

Figure 3:
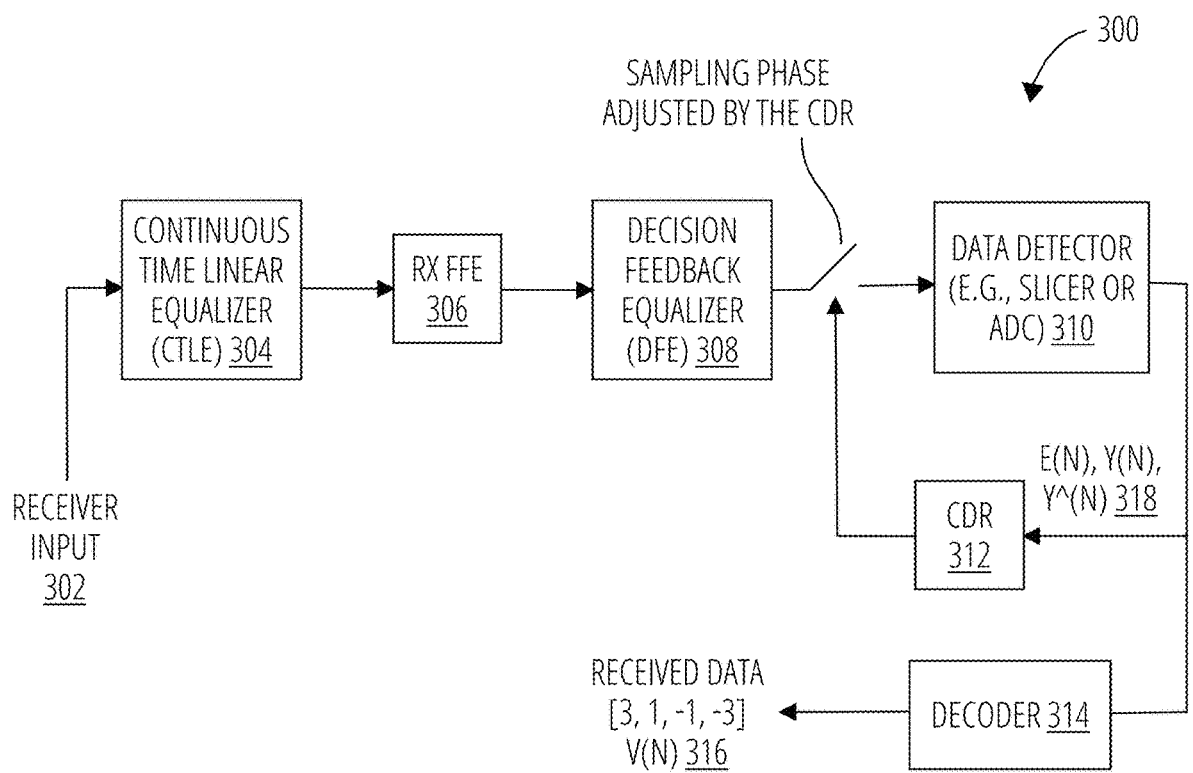
FIG. 3 depicts a receiver with partial response equalization 300 in accordance with one embodiment.

FIG. 3 depicts a block diagram of an exemplary receiver with partial response equalization 300. In some embodiments, the receiver with partial response equalization 300 includes receiver input 302, a continuous time linear equalizer 304, a receiver feed forward equalizer (receiver feedforward equalizer 306), a decision feedback equalizer 308, a data detector 310, a clock and data recovery, clock and data recovery circuit 312, and a decoder 314. In various embodiments, the transmission of data through the communication channel introduces inter-symbol interference to the transmitted data at the channel output. The receiver with partial response equalization 300 processes the channel output using equalizers to mitigate the effects of the inter-symbol interference.

The equalizers are used to reduce inter-symbol interference and allow recovery of the transmitted symbol. In some embodiments, the receiver input 302 is first received by a continuous time linear equalizer 304. The continuous time linear equalizer 304 provides a high pass filter at the receiver with partial response equalization 300 and endeavors to boost the higher frequencies at the receiver to bring all frequency components of the receiver input 302 to a similar amplitude.

The continuous time linear equalizer 304 output may be applied to a receiver feed-forward equalizer 306. The receiver feed-forward equalizer 306 is a linear equalizer and is used to pre-compensate the channel distortion of a signal.

The data may then pass through a decision feedback equalizer 308. The decision feedback equalizer 308 is a nonlinear equalizer to compensate the channel distortions without introducing noise amplification. The decision feedback equalizer 308 may apply previous data detector 310 decisions to eliminate the inter-symbol interference on pulses that are currently being demodulated.

A data detector 310 generates data bits or symbols from the output of the equalizers. The data detector may be a simple latch or data slicer, or an analog to digital converter (ADC).

The receiver samples the channel output at particular time instances to properly detect (e.g., slice) the received data without error. The data detector 310 adjusts the sampling phase based on the clock and data recovery circuit 312 output. The data detector 310 output y(n) may be decoded into a final received estimate of the transmitted data value, e.g., decoded data 316. In the absence of errors, v(n) matches a(n). If the data detector is an ADC then the y(n) may also be decoded to estimates of the partial response equalized symbols yˆ(n).

The receiver equalization and data detection may be implemented by a partial response system. As a non-limiting example in a duobinary partial response system, the nominal relationship (assuming no other impairments and perfect equalization) between the transmitted data and the data slicer output in the receiver may be expressed as per Equation 1 where again, y(n) is the data slicer output at symbol time n and a(n) and a(n−1) are the transmitted data bits at symbol times n and n−1, respectively. Referring to the receiver with partial response equalization 300 of FIG. 3, let y(n) be the received symbol value at the output of the analog to digital converter. These symbols may include various impairments in the system, including inter-symbol interference, noise, cross talk, etc. The decision estimates of the impaired partial response symbols y(n) at the at the output of the receiver's analog to digital converter may be denoted by yˆ(n). For example, these may take on values of 2, 0, −2 in PR1 systems with non-return-to-zero transmitted data. In various embodiments, error between the received symbol and its decision estimate is represented by e(n) and calculated by Equation 2.

In various embodiments, the data detector 310 sends e(n), y(n), yˆ(n) 318 to the clock and data recovery circuit 312.

Examples of communication channels include read channels for data storage, high speed serial links (e.g., NVLINK), deep space satellite communication channels etc.

The receiver with partial response equalization 300 depicted in FIG. 3 is a digital signal processing (DSP) based receiver which employs a data detector 310 (usually an analog to digital converter) to digitize or quantize or digitize the signal with relative fine granularity and performing digital signal processing operations on this quantized or digital signal.

PAM-4 communication may be implemented with the same basic receiver architecture. However, the practical challenges in processing a four-level signal with this architecture are significantly greater. This is particularly true for the clock and data recovery circuit 312 circuit.

Let y(n) be the received symbol value at the output of the data detector 310. These symbols will include all impairments in the system including ISI, noise, cross talk, etc. Let the decision estimates of the impairment partial response symbols y(n) at the at the output of the receiver ADC be $\hat{y}(n)$. For PAM-4 transmitted symbols of −3, −1, 1, 3, $\hat{y}(n)$ will take on values of −6, −4, −2, 0, 2 Let e(n) be the difference or error between the received symbol and its decision estimate $$e(n)=y(n)-\hat{y}(n) \qquad \text{Equation 2}$$

An exemplary timing gradient, A(n), is the Mueller and Muller timing gradient as given by the next equation.

$$\Delta(n)=y(n)\hat{y}(n-1)-y(n-1)\hat{y}(n) \qquad \text{Equation 3}$$

This gradient can also be written as:

$$\Delta(n)=e(n)\hat{y}(n-1)-e(n-1)\hat{y}(n) \qquad \text{Equation 4}$$

Figure 4:
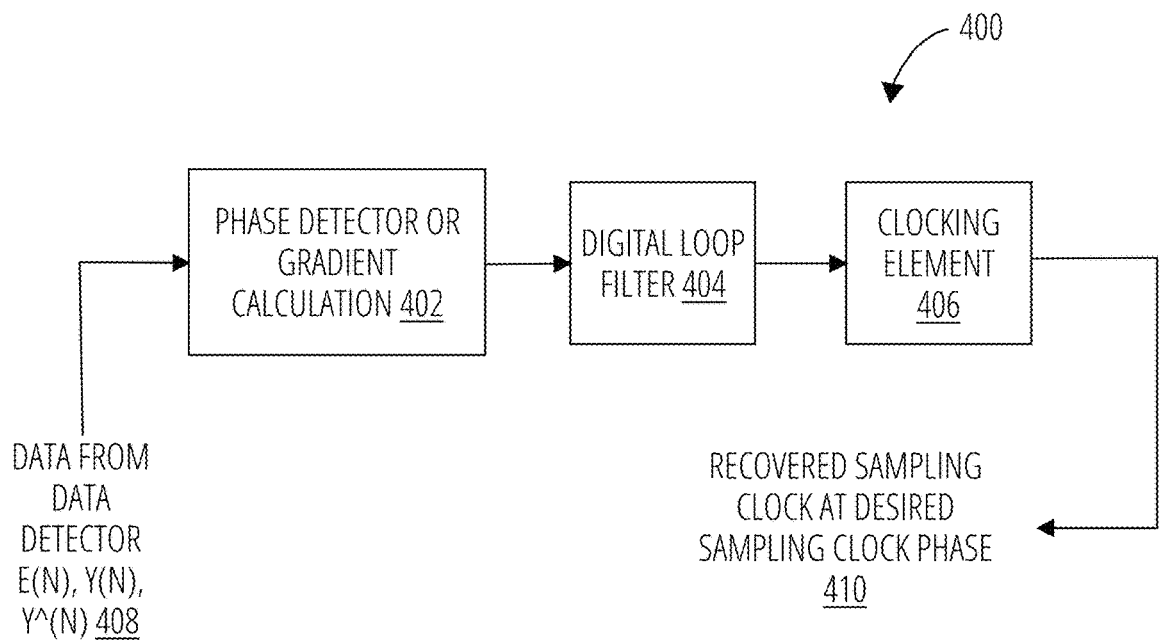
FIG. 4 depicts a clock and data recovery system 400 in accordance with another embodiment.

This equation represents the output of the phase calculator 402/phase detector of the clock and data recovery system 400 depicted in FIG. 4, which drives the CDR digital loop filter 404 input. The digital loop filter 404 output drives a clocking element 406 to process data detector output 408 signals into the recovered clock 410.

In other embodiments, an accumulated version of the gradient may be utilized to drive the loop filter. For example if the gradient may be accumulated over L symbols, such that:

$$\Delta_L(n) = \sum_0^{L-1} \Delta(n) \qquad \text{Equation 5}$$

Figure 5:
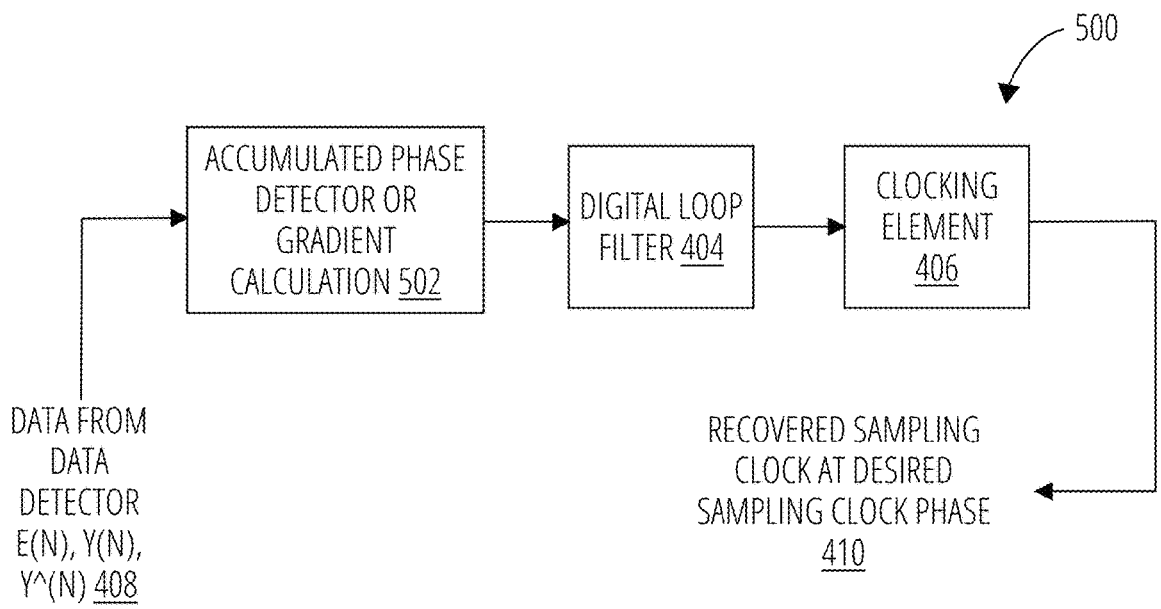
FIG. 5 depicts a clock and data recovery system 500 in accordance with one embodiment.

The use of an accumulated phase or gradient calculator 502 (over L>1 symbols) instead of a raw or instantaneous gradient to drive the digital loop filter 404 is depicted in the clock and data recovery system 500 of FIG. 5.

The phase detector behavior may be depicted by an S-curve or timing gradient curve that illustrates the relationship between the average phase detector output and how distant the recovered clock is from the correct sampling phase. Ideally the curve would be a linear curve spanning −0.5 T to 0.5 T on the x-axis and going through zero. In other words, when the recovered clock phase has no deviation from the optimal sampling phase, the phase detector output should be zero. When the phase detector output begins deviating from zero, it should be proportional to the phase deviation. However this may not be the case in practice.

Figure 6:
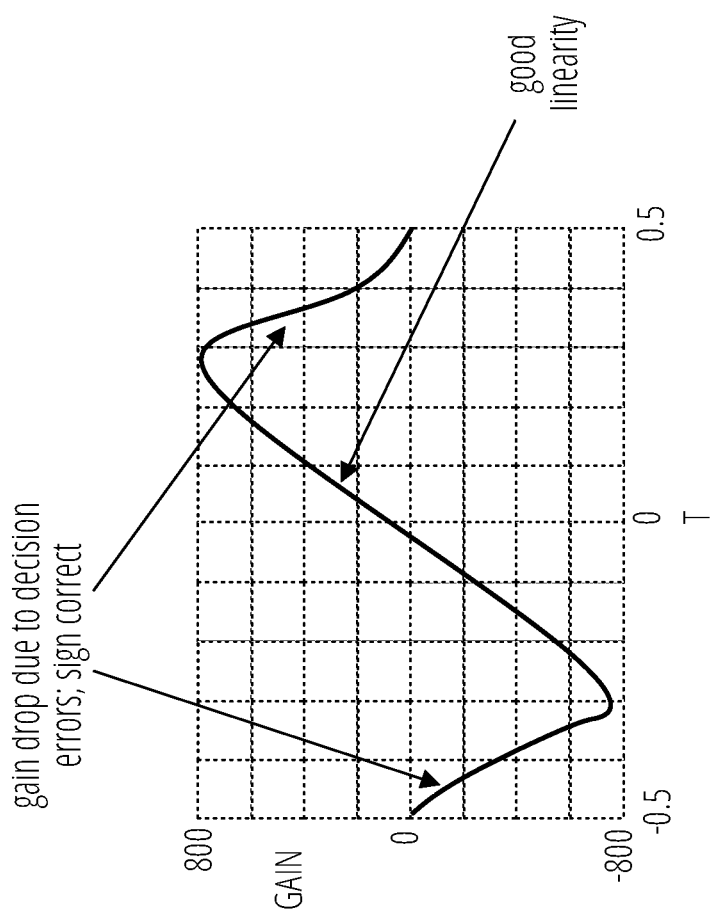
FIG. 6 depicts a gradient characteristic graph in accordance with one embodiment.

An exemplary S-curve is shown in FIG. 6 for a NRZ/PAM-2 system equalized to a PR1 target. Over part of the curve, the behavior demonstrates the desired linear characteristic. However for larger sampling phase, deviations to the left or right of the optimal point, the gain of the phase detector drops off until it becomes zero. This implies that even though the sampling phase is incorrect the phase detector is unable to generate an output sufficient to move it away from the incorrect phase.

Figure 7:
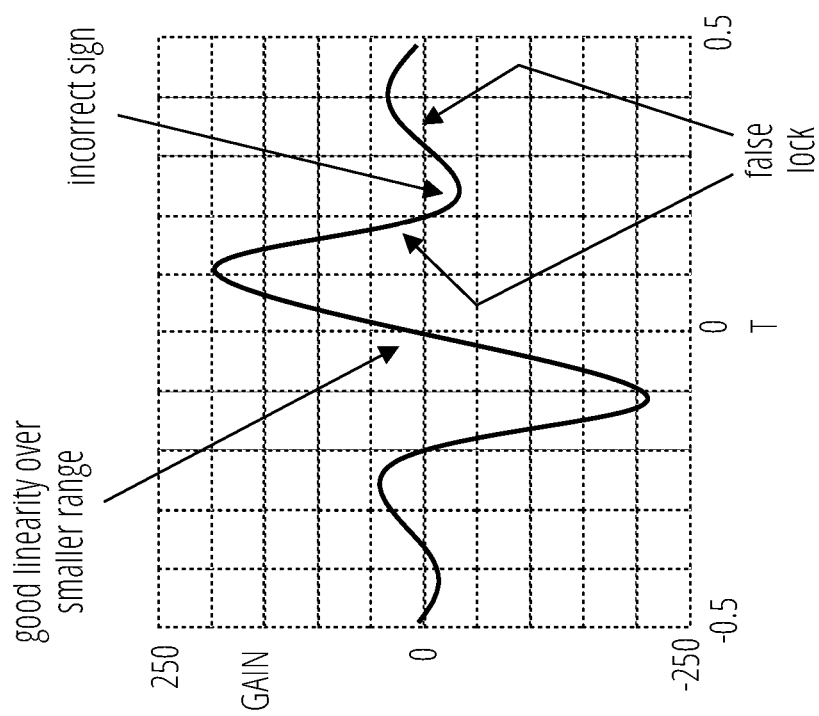
FIG. 7 depicts a gradient characteristic graph in accordance with another embodiment.

For a PAM-4 system equalized to a PR1 response an exemplary S-curve is depicted in FIG. 7. Here the linear region is even narrower, and this curve has additional undesirable properties:

(i) in addition to the region at +/−0.5 T away from the optimal sampling phase it has other sampling phases other than the optimal point where the PD output is 0. This is known as a false lock.

(ii) for some regions of the sampling the phase the gradient produces the incorrect sign which drives the CDR loop in the wrong direction.

It is desirable therefore to more robustly converge and settle to the correct sampling point or lock point in the presence of initial sampling phase errors, frequency offsets, and other noise/jitter in the system.

At the optimal CDR sampling phase, a partial response system's consecutive equalized data detected symbols have a clear relationship. For example in the 1+D or PR1 system as noted in Equation 1, for a transmitted data sequence comprised of symbols 3, 1, −1, and −3 the unimpaired received sequence of decisions can take on values −6, −4, −2, 0, 2, 4, 6. In the absence of significant sampling phase or timing errors, the partial response constrains the received symbols at the output of the data slicer. However, if the initial sampling phase is 0.5 T offset from the optimal sampling phase, the relationship is violated and can be detected digitally with a digital error detector by examining the corresponding data sliced symbols. This behavior may be exploited to detect illegal symbol conditions (for a PR1 system, decisions that fall outside the enumerated values described above). An illegal data detector circuit may be implemented with logic to count occurrence of consecutive illegal conditions. A minimal set of conditions that determine the presence of erroneous data in a PAM-4 PR1 system may be represented by the following algorithm, wherein an erroneous condition is represented by errcnd=1, and a non-erroneous condition is represented by errcnd=0:

```
if  ((ŷ(n−1)1==−6&&ŷ(n)>0)||(ŷ(n−1)>0&&ŷ(n)==−6))
    {errcnd=1;
    }
    else if ((ŷ(n−1)==−4&&ŷ(n)>2)||(ŷ(n−1)dn1>2&&ŷ(n)
        ==−4)){errcnd=1;
    }
    else if ((ŷ(n−1)==−2&&ŷ(n)==6)||(ŷ(n−1)==6&&ŷ(n)
        ==−2)){errcnd=1;
    }
    else if ((ŷ(n−1)==2&&ŷ(n)==−6)||(ŷ(n−1)==−6&&ŷ
        (n)==2)){errcnd=1;
    }
    else if ((ŷ(n−1)==4&&ŷ(n)<−2)||(ŷ(n−1)<−2&&ŷ(n)
        ==4)){errcnd=1;
    }
    else if  ((ŷ(n−1)==6&&ŷ(n)<0)||(ŷ(n−1)<0&&ŷ(n)
        ==6)){errcnd=1;
    }
    else {
       errend=0
    }
```

Algorithm 1

In the notation above "==" means whether a quantity is equal to another i.e. "a==b" queries whether a is equal to b or not; if a and b are equal the expression is 1 and if a and b are not equal the expression is a zero. If a is equal to b, the result of that query is a 1. The operation "||" is a logical or operation i.e. "a||b" is equal to 1 when either of a or b is equal to 1, otherwise it is equal to 0. The operation "&&" implies a logical and operation i.e. "a && b" is equal to 1 only if a and b are both 1; otherwise it is equal to 0.

The number of such illegal decisions (number of occurrences of errcnd=1) may be subject to a filtering constraint such as the number of such conditions exceeding some threshold T over some measurement window W. Configuring such a condition may help distinguish between cases in which an illegal condition is due to a large phase error (which would result in multiple contiguous illegal cases) vs. an isolated illegal condition that may be caused by instantaneous noise or jitter impairment. If the illegal condition is met, an additional increment of magnitude of Km is injected on top of the normal accumulated gradient. The injected value is also qualified by the sign of how the gradient was accumulating in the short term past i.e. choose the sign of K such that it adds in the same direction that the gradient accumulation was proceeding. This algorithm is represented in Equation 6.

$$K=Km*\text{sign}(\Delta_L(n-L)) \quad \text{Equation 6}$$

Although Equation 6 depicts an exemplary value of L for how far in the past to examine, other values may also be advantageous such as DL(n-S) where S is another exemplary value unequal to L.

Figure 8:
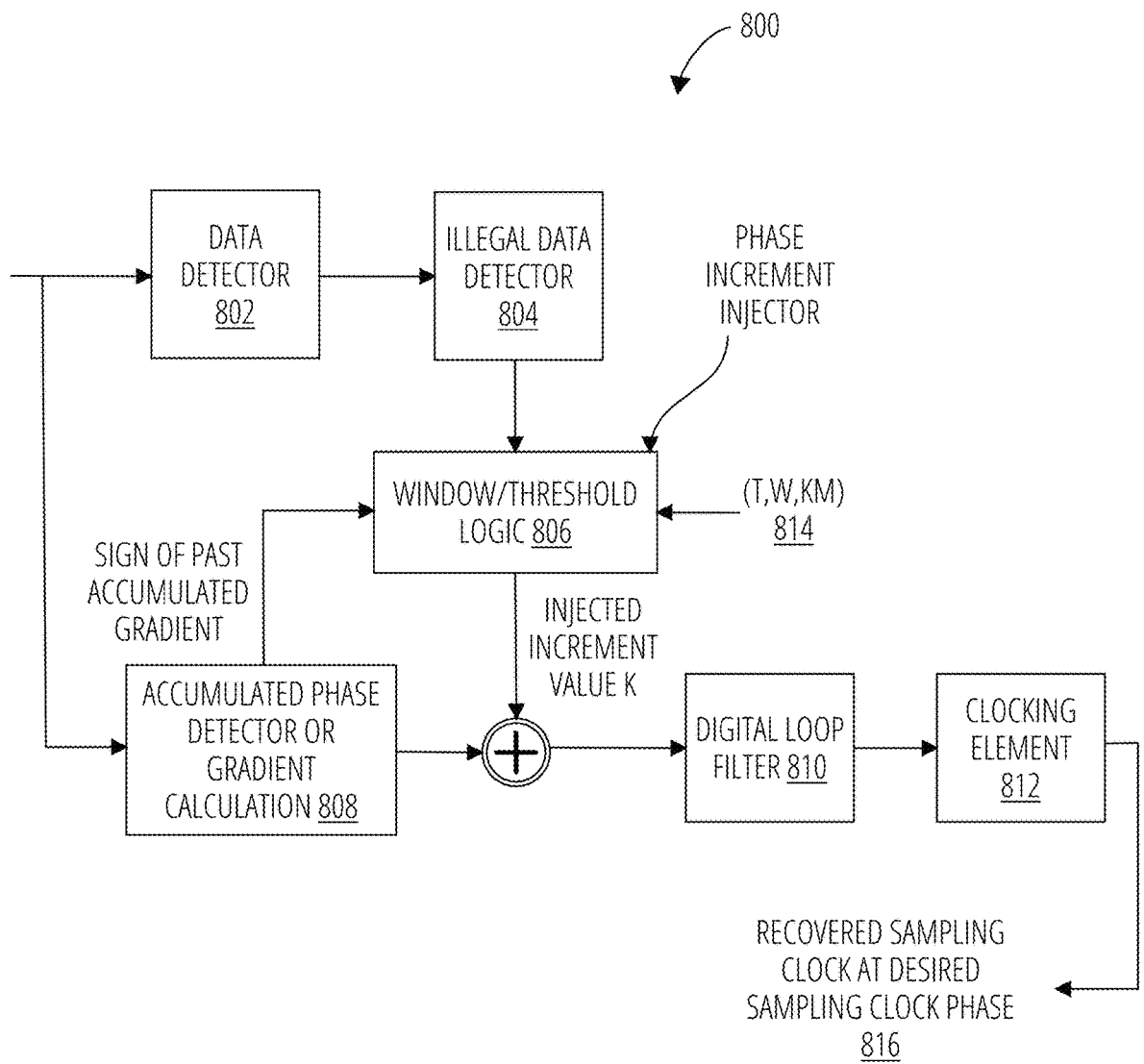
FIG. 8 depicts a clock and data recovery system 800 in accordance with yet another embodiment.

FIG. 8 depicts a clock and data recovery system 800 in accordance with one embodiment. The clock and data recovery system 800 includes a data detector 802, an illegal data detector 804, window/threshold logic 806, an accumulated phase detector 808, a digital loop filter 810 and a clocking element 812. In some embodiments, the illegal data detector 804 receives data from the data detector 802 and detects illegal decisions. The window/threshold logic 806 determines whether the number of occurrence of the illegal decisions in exceeds a pre-defend number over a pre-defined time period and whether to add additional increment of magnitude Km, e.g., (T, W, Km) 814. The window/threshold logic 806 is fed the sign of past accumulated gradient by the accumulated phase detector 808. The window/threshold logic 806 then calculates the injected increment value K and sends it to the digital loop filter 810 which is subsequently fed to the clocking element 812. The output of the clocking element 812 is recovered clock 816.

For example if the clock element is a phase interpolator, the clock and data recovery operation may utilize the clock and data recovery loop filter to instruct the phase interpolator to advance or retard by a certain phase amount or, equivalently, by a certain number of digital phase codes, as calculated by the loop filter.

Figure 9:
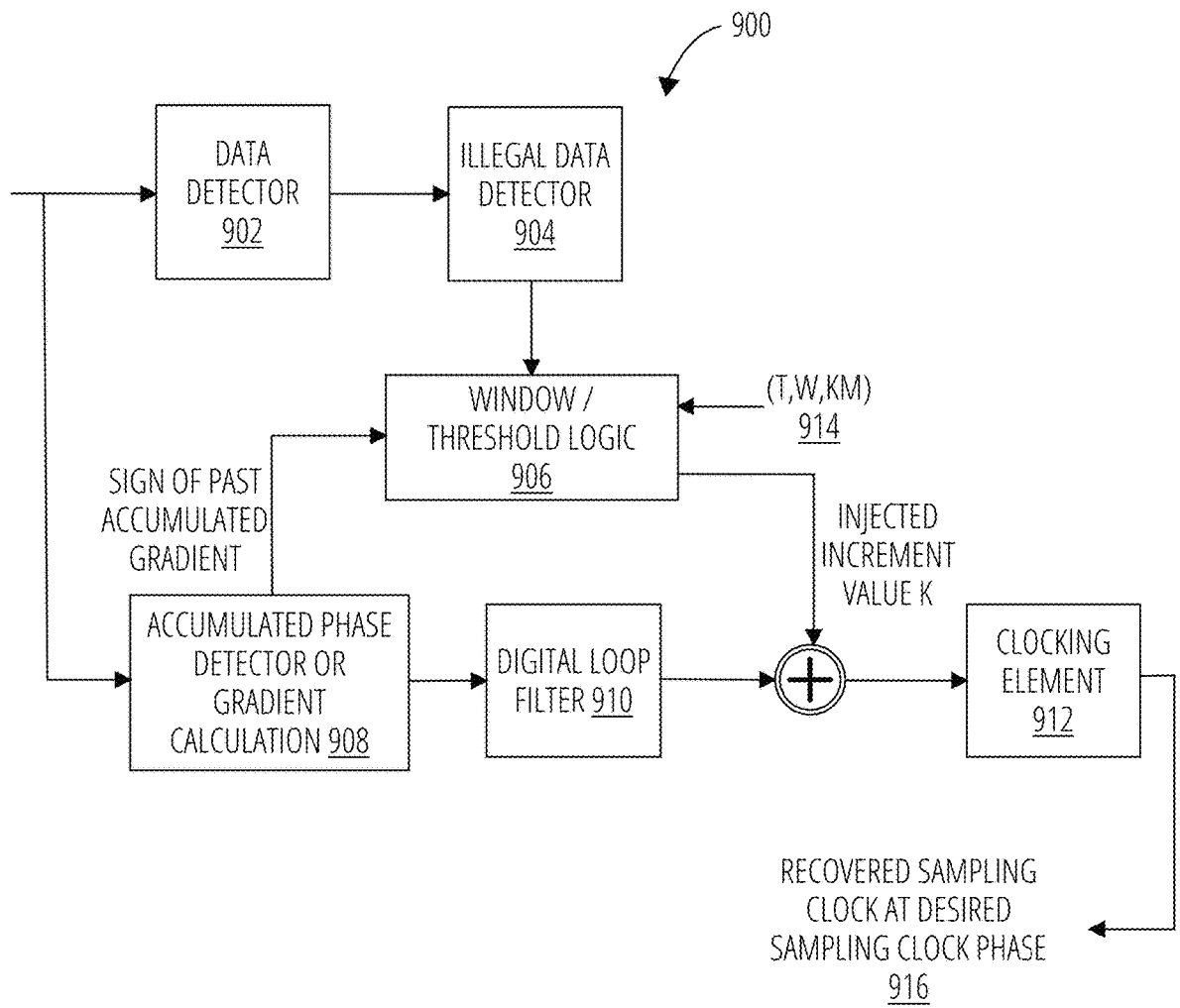
FIG. 9 depicts a clock and data recovery system 900 in accordance with yet another embodiment.

One variation to the invention is for the injected increment to be applied not to the accumulated gradient but applied directly to the clock element. For example if the clock element is a phase interpolator (PI), normal CDR operation is such the CDR loop filter instructs the phase interpolator to advance or retard by a certain phase amount or equivalently by a certain number of digital phase codes as calculated by the loop filter. An increment may be injected as the additional phase codes the phase interpolator should traverse in addition to what it would have been directed to traverse by the loop filter under normal operation. This variation is depicted in FIG. 9, which depicts a clock and data recovery system 900 in accordance with yet another embodiment in which an increment may be injected as additional phase codes the phase interpolator may traverse, in addition to what it may have been directed to traverse by the loop filter.

The clock and data recovery system 900 includes a data detector 902, an illegal data detector 904, a window/threshold logic 906, an accumulated phase detector 908, a digital loop filter 910 and a clocking element 912. In some embodiments, the illegal data detector 904 receives data from the data detector 902 and detects illegal decisions. The window/threshold logic 906 determines whether the number of occurrence of the illegal decisions exceeds a pre-defend number over a pre-defined time period and whether to add additional increment of magnitude Km, e.g., (T, W, Km) 914. The window/threshold logic 906 is fed the sign of past accumulated gradient by the accumulated phase detector 908. The accumulated phase detector 908 further feeds the digital loop filter 910. The window/threshold logic 906 then calculates the injected increment value K and sends it to the clocking element 912. The output of the clocking element 912 is recovered clock 916.

Embodiments of the disclosed circuits may be applied to partial response beyond just PR1. Using a different partial response means the illegal data detector criterion to determine illegal detected data symbols would be adapted accordingly. The illegal data detection criterion could be derived from the specific partial response system under consideration.

Other variations to the invention may apply the injected increment value at different points within the CDR loop filter. In the embodiments depicted herein, the injected increment is applied to the timing estimate calculated at the input or output of the loop filter. Other variations may apply the injected increment at an intermediate node of the loop filter. This may be especially beneficial in optimizing the fixed point details of the CDR loop filter behavior with respect to internal clipping values inside the loop filter.

Exemplary illegal data conditions may be determined for a PR2 system as well. This may be beneficial for channels with very high loss. A PR2 system is characterized by Equation 7.

$$y(n)=a(n)+2a(n-1)+a(n-2) \quad \text{Equation 7}$$

In a PR2 system the equalized slice data, or symbol estimates yˆ(n), may take on a set of values from the set −12, −10, −8, −6, −4, −2, 0, 2, 4, 6, 8, 10, 12. The following exemplary algorithm enables detection of illegal data in a PR2 system to trigger additional phase compensation.

if  ((ŷ(n−1)1==−12&&ŷ(n)>−6)||(ŷ(n−1)>−6&&ŷ(n)==−12)){errcnd=1; }
if  ((ŷ(n−1)1==−10&&ŷ(n)>−2)||(ŷ(n−1)>−2&&ŷ(n)==−10)){errcnd=1; }
if  ((ŷ(n−1)1==−8&&ŷ(n)>2)||(ŷ(n−1)>2&&ŷ(n)==−8)) {errcnd=1; }
if  ((ŷ(n−1)1==−6&&ŷ(n)>6)||(ŷ(n−1)>6&&ŷ(n)==−6)) {errcnd=1; }
if  ((ŷ(n−1)1==−4&&ŷ(n)>6)||ŷ(n)<−10))||((ŷ(n−1)>6||ŷ(n−1)<−10)&&ŷ(n)==−4)){errcnd=1; }
if  ((ŷ(n−1)1==−2&&ŷ(n)>8)||ŷ(n)<−10))||((ŷ(n−1)>8||ŷ(n−1)<−10)&& ŷ(n)==−2)){errcnd=1; }
if  ((ŷ(n−1)1==0&&ŷ(n)>8)||ŷ(n)<−8))||((ŷ(n−1)>8||ŷ(n−1)<−8)&& ŷ(n)==0)){errcnd=1; }
if  ((ŷ(n−1)1==2&&ŷ(n)>10)||ŷ(n)<−8))||((ŷ(n−1)>10||ŷ(n−1)<−8)&& ŷ(n)==2)){errcnd=1; }
if  ((ŷ(n−1)1==4&&ŷ(n)>10)||ŷ(n)<−6))||((ŷ(n−1)>10||ŷ(n−1)<−6)&& ŷ(n)==4)){errcnd=1; }
if ((ŷ(n−1)1==6&&ŷ(n)<−6||(ŷ(n−1)<−6)&&ŷ(n)==6)) {errcnd=1; }
if  ((ŷ(n−1)1==8&&ŷ(n)<−2)||(ŷ(n−1)>−2)&&ŷ(n)==8)) {errcnd=1; }
if  ((ŷ(n−1)1==10&&ŷ(n)<2)||(ŷ(n−1)<2)&&ŷ(n)==10)) {errcnd=1; }
if  ((ŷ(n−1)1==12&&ŷ(n)<6)||(ŷ(n−1)<6)&&ŷ(n)==12)) {errcnd=1; }

Algorithm 2

Consider a voltage controlled oscillator (VCO) based CDR clocking element. A digital loop filter followed by a VCO is also known as a digital controlled oscillator (DCO)

based CDR. For a VCO based CDR a typical second order loop filter comprises a proportional and integral path. The proportional path is a gained version of the phase detector output which is scaled by the proportional VCO clocking element. The integral path performs a digital integrating or accumulation operation of the phase detector output before being scaled by the integral VCO clocking element and added to the output of the proportional path.

In an exemplary case the phase detector outputs comprise a stream of "ups" and "downs" or no update values. If represented by two bits or two wires, a phase detector "up" signals comprises the up wire being activated and the down wire not being activated. A phase detector "down" signal comprises the up wire not being activated and the "down" wire being activated. No update from the phase detector is represented by no activation on either "up" or "down" wires. Moreover in a typical CDR implementation the phase detector output will typically be processed in chunks of time intervals of which exemplary values are 8 Tb, 16 Tb, 32 Tb, 64 Tb where Tb is the baud period. The number of phase detector outputs across this time interval can be represented either by that many pairs of up/down wires or equivalently as a digital integer sum of all the up/downs across the time interval—or it may be represented in both formats for use differently by different parts of the loop filter.

Figure 10:
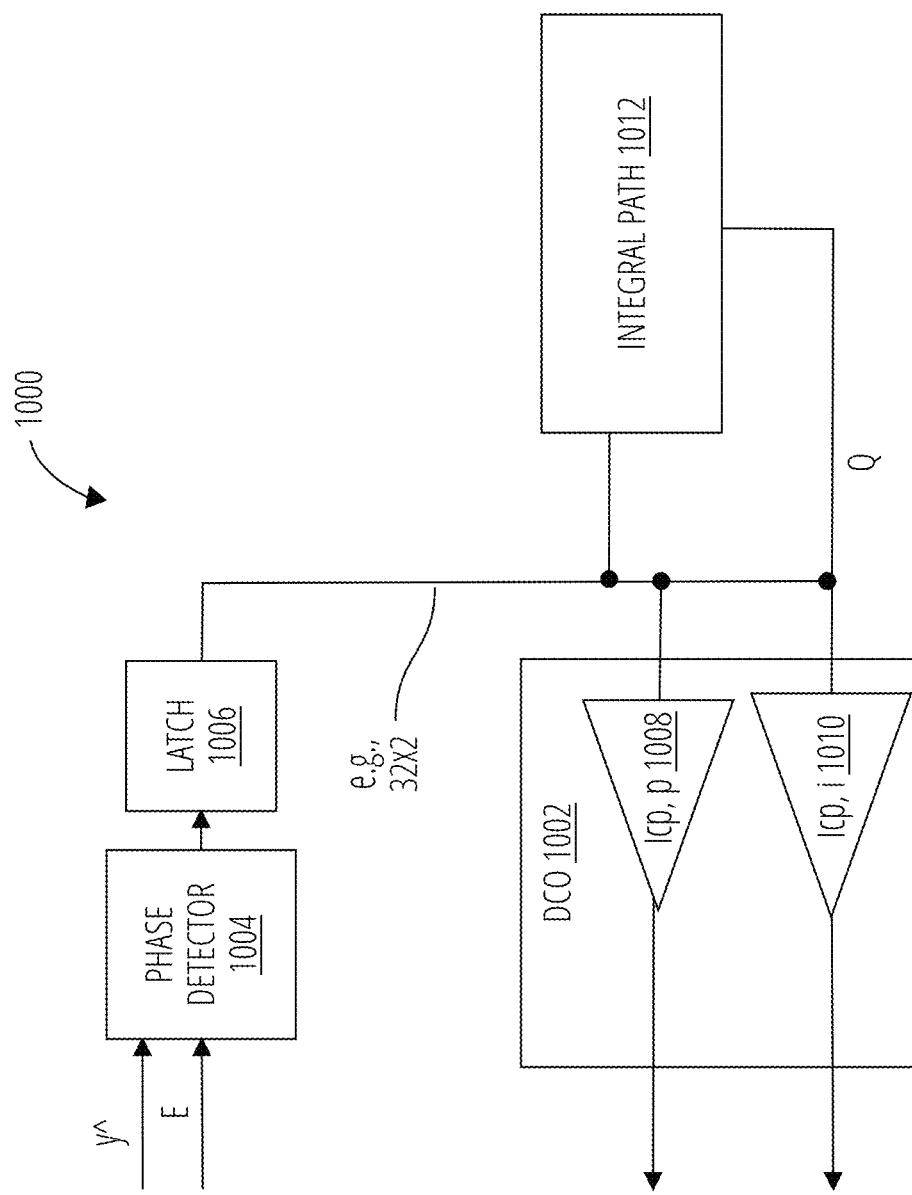
FIG. 10 depicts a voltage-controlled oscillator based clock data recovery 1000 in accordance with one embodiment.

FIG. 10 depicts an exemplary VCO or DCO 1002 based CDR. The voltage-controlled oscillator based clock data recovery 1000 depicted in FIG. 10 comprises a phase detector 1004, a latch 1006, a DCO 1002, an Icp, p 1008, an Icp, i 1010, and an integral path 1012. This voltage-controlled oscillator based clock data recovery 1000 comprises phase detector 1004 outputs across an interval of 32 T driving the proportional path of the DCO noted by a proportional path charge pump current Icp, p 1008 that controls the proportional VCO (not shown here). As each up/down pair is represented by 2 wires, for a total of 32×2 wires. The 32 phase detector 1004 up/downs are also input to the integral path where they are accumulated digitally to form a digital sum and further processed by the integral path before being converted to a multi-bit number driving a multi-bit (Q bits) integral path charge pump digital to analog converter (DAC) represented by Icp, i 1010. Icp, i 1010 controls the integral path VCO (not depicted).

Figure 11:
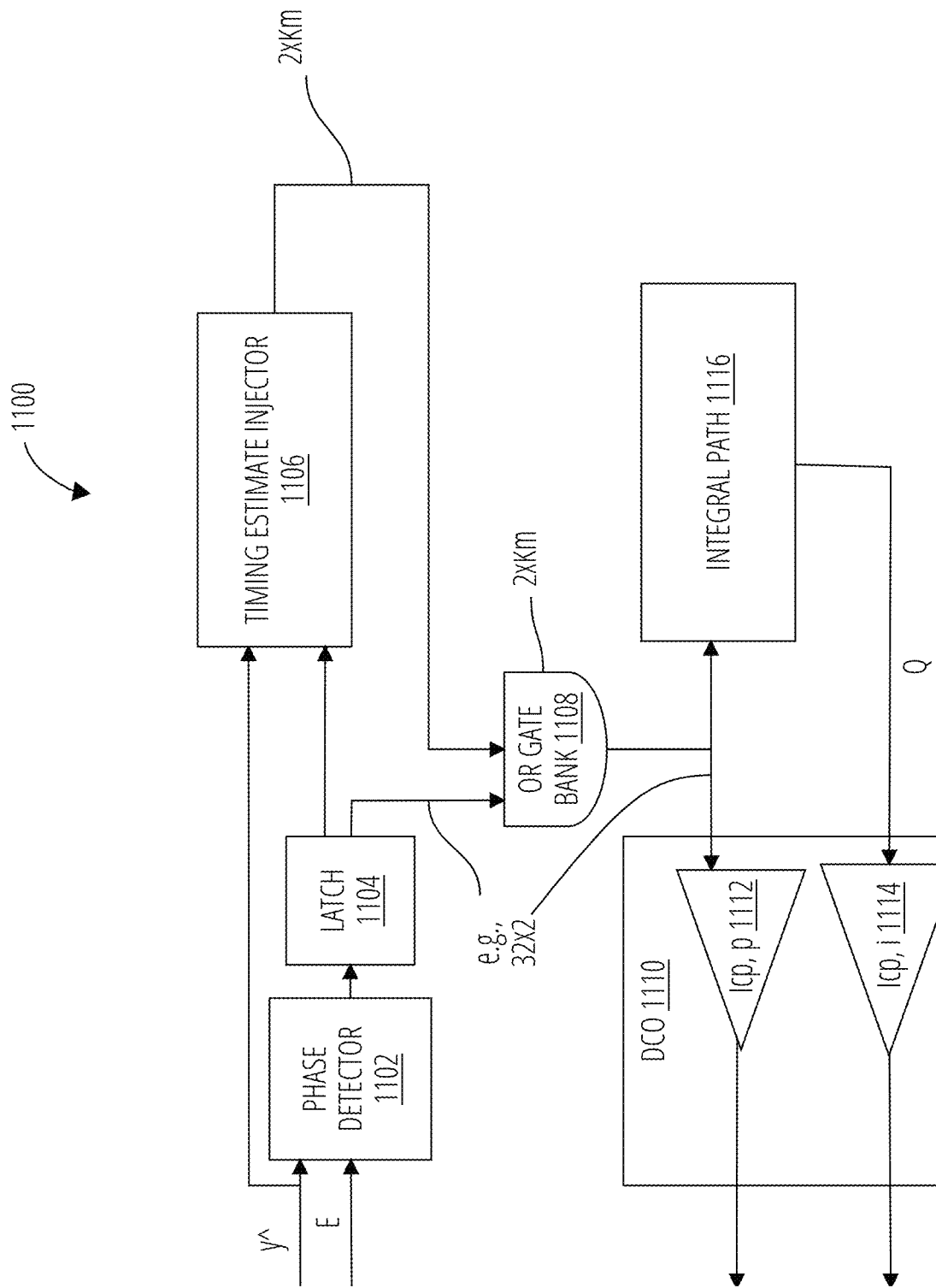
FIG. 11 depicts a voltage-controlled oscillator based clock data recovery 1100 in accordance with one embodiment.

The timing estimate injection may be incorporated into the CDR behavior in an efficient manner by using a number of digital OR logic gates. FIG. 11 depicts voltage-controlled oscillator based clock data recovery 1100 in one embodiment. In FIG. 11 the timing estimate injection with magnitude Km is represented by Km up/down wires. For example suppose Km=+8 then 8 up wires are activated by the timing estimate injection logic and the corresponding down wires are not activated. These 2×Km wires are then logically OR'd with 2 x Km up/down wires from the main or raw phase detector up/down path. No actual digital addition is performed keeping the implementation simple and moreover keeping the bit width of the signal input to the integral path unincreased. Although no digital addition is performed, the implementation with OR gates is equivalent to adding 32 [−1, 0, 1] phase detector outputs to Km value that are distributed over 32 T worth of [−1, 0, 1] up/downs.

FIG. 11 depicts such an exemplary VCO or DCO based clock data recovery. A voltage-controlled oscillator based clock data recovery 1100 system as depicted comprises a phase detector 1102; a latch 1104; a timing estimate injector 1106; an OR gate bank 1108; a DCO 1110; a proportional path charge pump (Icp, p 1112); and an integral path charge pump (Icp, i 1114) on an integral path 1116. This exemplary clock data recovery system has the phase detector 1102 outputs across an interval of 32 T (as set for example by latch 1104) driving the proportional path of the DCO 1110 by a proportional path charge pump current (Icp, i 1114) which controls the proportional VCO (not depicted). Because each up/down pair is represented by two wires, there are a total of 32×2 wires. The 32 phase detector 1102 up/downs are also input to the integral path 1116 where they are accumulated digitally to form a digital sum and further processed by the integral path 1116 before being converted to a multi-bit number driving a multi-bit (Q bits) integral path charge pump digital to analog converter (DAC) represented by Icp, i 1114. Icp, i 1114 controls the integral path VCO (not shown here).

For this exemplary clock data recovery implementation, the timing estimate injector 1106 may be incorporated into the clock data recovery behavior in an efficient manner by using a number of digital OR logic gates (the OR gate bank 1108).

Embodiments of the circuits disclosed herein may be utilized by computing platforms comprising one or more graphic processing unit (GPU) and/or general purpose data processor (e.g., a 'central processing unit or CPU). Exemplary system architectures will now be described that may be configured with embodiments of the circuits disclosed herein.

The following description may use certain acronyms and abbreviations as follows:
"DPC" refers to a "data processing cluster";
"GPC" refers to a "general processing cluster";
"I/O" refers to a "input/output";
"L1 cache" refers to "level one cache";
"L2 cache" refers to "level two cache";
"LSU" refers to a "load/store unit";
"MMU" refers to a "memory management unit";
"MPC" refers to an "M-pipe controller";
"PPU" refers to a "parallel processing unit";
"PROP" refers to a "pre-raster operations unit";
"ROP" refers to a "raster operations";
"SFU" refers to a "special function unit";
"SM" refers to a "streaming multiprocessor";
"Viewport SCC" refers to "viewport scale, cull, and clip";
"WDX" refers to a "work distribution crossbar"; and
"XBar" refers to a "crossbar".

Parallel Processing Unit

Figure 12:
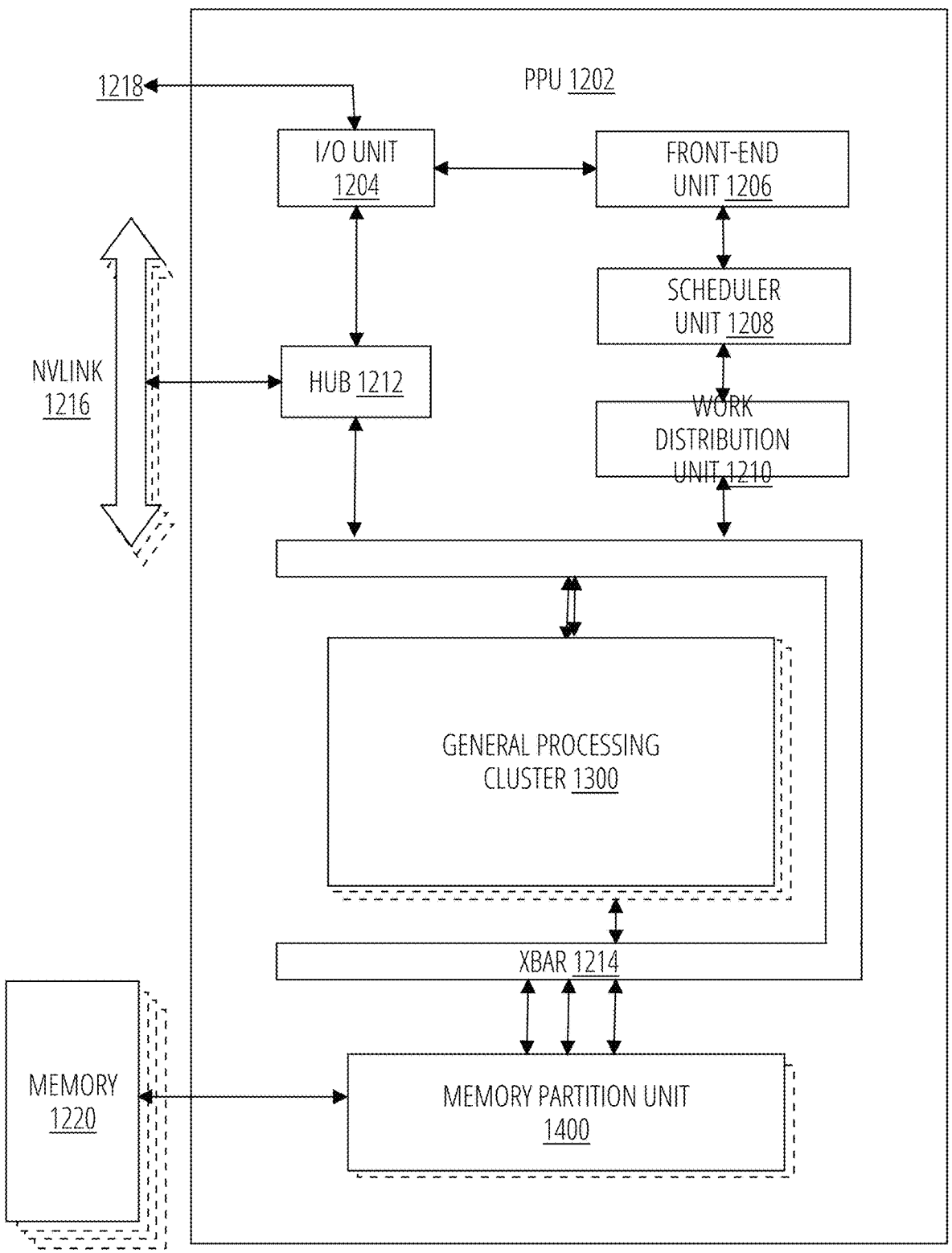
FIG. 12 depicts a parallel processing unit 1202 in accordance with one embodiment.

FIG. 12 depicts a parallel processing unit 1202, in accordance with an embodiment. In an embodiment, the parallel processing unit 1202 is a multi-threaded processor that is implemented on one or more integrated circuit devices. The parallel processing unit 1202 is a latency hiding architecture designed to process many threads in parallel. A thread (e.g., a thread of execution) is an instantiation of a set of instructions configured to be executed by the parallel processing unit 1202. In an embodiment, the parallel processing unit 1202 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the parallel processing unit 1202 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more parallel processing unit 1202 modules may be configured to accelerate thousands of High Performance Computing (HPC), data center, and machine learning applications. The parallel processing unit 1202 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 12, the parallel processing unit 1202 includes an I/O unit 1204, a front-end unit 1206, a scheduler unit 1208, a work distribution unit 1210, a hub 1212, a crossbar 1214, one or more general processing cluster 1300 modules, and one or more memory partition unit 1400 modules. The parallel processing unit 1202 may be connected to a host processor or other parallel processing unit 1202 modules via one or more high-speed NVLink 1216 interconnects.

The parallel processing unit 1202 may be connected to a host processor or other peripheral devices via an interconnect 1218. The parallel processing unit 1202 may also be connected to a local memory comprising a number of memory 1220 devices. In an embodiment, the local memory may comprise a number of dynamic random access memory (DRAM) devices. The DRAM devices may be configured as a high-bandwidth memory (HBM) subsystem, with multiple DRAM dies stacked within each device. The memory 1220 may comprise logic to configure the parallel processing unit 1202 to carry out aspects of the techniques disclosed herein.

The interconnects (e.g., NVLink 1216, interconnect 1218) may implement PAM-4 communication and thus comprise and benefit from embodiments of the CDR circuits described herein.

The NVLink 1216 interconnect enables systems to scale and include one or more parallel processing unit 1202 modules combined with one or more CPUs, supports cache coherence between the parallel processing unit 1202 modules and CPUs, and CPU mastering. Data and/or commands may be transmitted by the NVLink 1216 through the hub 1212 to/from other units of the parallel processing unit 1202 such as one or more copy engines, a video encoder, a video decoder, a power management unit, etc. (not explicitly shown). The NVLink 1216 is described in more detail in conjunction with FIG. 16.

The I/O unit 1204 is configured to transmit and receive communications (e.g., commands, data, etc.) from a host processor (not shown) over the interconnect 1218. The I/O unit 1204 may communicate with the host processor directly via the interconnect 1218 or through one or more intermediate devices such as a memory bridge. In an embodiment, the I/O unit 1204 may communicate with one or more other processors, such as one or more parallel processing unit 1202 modules via the interconnect 1218. In an embodiment, the I/O unit 1204 implements a Peripheral Component Interconnect Express (PCIe) interface for communications over a PCIe bus and the interconnect 1218 is a PCIe bus. In alternative embodiments, the I/O unit 1204 may implement other types of well-known interfaces for communicating with external devices.

The I/O unit 1204 decodes packets received via the interconnect 1218. In an embodiment, the packets represent commands configured to cause the parallel processing unit 1202 to perform various operations. The I/O unit 1204 transmits the decoded commands to various other units of the parallel processing unit 1202 as the commands may specify. For example, some commands may be transmitted to the front-end unit 1206. Other commands may be transmitted to the hub 1212 or other units of the parallel processing unit 1202 such as one or more copy engines, a video encoder, a video decoder, a power management unit, etc. (not explicitly shown). In other words, the I/O unit 1204 is configured to route communications between and among the various logical units of the parallel processing unit 1202.

In an embodiment, a program executed by the host processor encodes a command stream in a buffer that provides workloads to the parallel processing unit 1202 for processing. A workload may comprise several instructions and data to be processed by those instructions. The buffer is a region in a memory that is accessible (e.g., read/write) by both the host processor and the parallel processing unit 1202. For example, the I/O unit 1204 may be configured to access the buffer in a system memory connected to the interconnect 1218 via memory requests transmitted over the interconnect 1218. In an embodiment, the host processor writes the command stream to the buffer and then transmits a pointer to the start of the command stream to the parallel processing unit 1202. The front-end unit 1206 receives pointers to one or more command streams. The front-end unit 1206 manages the one or more streams, reading commands from the streams and forwarding commands to the various units of the parallel processing unit 1202.

The front-end unit 1206 is coupled to a scheduler unit 1208 that configures the various general processing cluster 1300 modules to process tasks defined by the one or more streams. The scheduler unit 1208 is configured to track state information related to the various tasks managed by the scheduler unit 1208. The state may indicate which general processing cluster 1300 a task is assigned to, whether the task is active or inactive, a priority level associated with the task, and so forth. The scheduler unit 1208 manages the execution of a plurality of tasks on the one or more general processing cluster 1300 modules.

The scheduler unit 1208 is coupled to a work distribution unit 1210 that is configured to dispatch tasks for execution on the general processing cluster 1300 modules. The work distribution unit 1210 may track a number of scheduled tasks received from the scheduler unit 1208. In an embodiment, the work distribution unit 1210 manages a pending task pool and an active task pool for each of the general processing cluster 1300 modules. The pending task pool may comprise a number of slots (e.g., 32 slots) that contain tasks assigned to be processed by a particular general processing cluster 1300. The active task pool may comprise a number of slots (e.g., 4 slots) for tasks that are actively being processed by the general processing cluster 1300 modules. As a general processing cluster 1300 finishes the execution of a task, that task is evicted from the active task pool for the general processing cluster 1300 and one of the other tasks from the pending task pool is selected and scheduled for execution on the general processing cluster 1300. If an active task has been idle on the general processing cluster 1300, such as while waiting for a data dependency to be resolved, then the active task may be evicted from the general processing cluster 1300 and returned to the pending task pool while another task in the pending task pool is selected and scheduled for execution on the general processing cluster 1300.

The work distribution unit 1210 communicates with the one or more general processing cluster 1300 modules via crossbar 1214. The crossbar 1214 is an interconnect network that couples many of the units of the parallel processing unit 1202 to other units of the parallel processing unit 1202. For example, the crossbar 1214 may be configured to couple the work distribution unit 1210 to a particular general processing cluster 1300. Although not shown explicitly, one or more other units of the parallel processing unit 1202 may also be connected to the crossbar 1214 via the hub 1212.

The tasks are managed by the scheduler unit 1208 and dispatched to a general processing cluster 1300 by the work distribution unit 1210. The general processing cluster 1300 is configured to process the task and generate results. The results may be consumed by other tasks within the general processing cluster 1300, routed to a different general processing cluster 1300 via the crossbar 1214, or stored in the memory 1220. The results can be written to the memory 1220 via the memory partition unit 1400 modules, which implement a memory interface for reading and writing data to/from the memory 1220. The results can be transmitted to another parallel processing unit 1202 or CPU via the NVLink 1216. In an embodiment, the parallel processing unit 1202 includes a number U of memory partition unit 1400 modules that is equal to the number of separate and distinct memory 1220 devices coupled to the parallel processing unit 1202. A memory partition unit 1400 will be described in more detail below in conjunction with FIG. 14.

In an embodiment, a host processor executes a driver kernel that implements an application programming interface (API) that enables one or more applications executing on the host processor to schedule operations for execution on the parallel processing unit 1202. In an embodiment, multiple compute applications are simultaneously executed by the parallel processing unit 1202 and the parallel processing unit 1202 provides isolation, quality of service (QoS), and independent address spaces for the multiple compute applications. An application may generate instructions (e.g., API calls) that cause the driver kernel to generate one or more tasks for execution by the parallel processing unit 1202. The driver kernel outputs tasks to one or more streams being processed by the parallel processing unit 1202. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 15.

Figure 13:
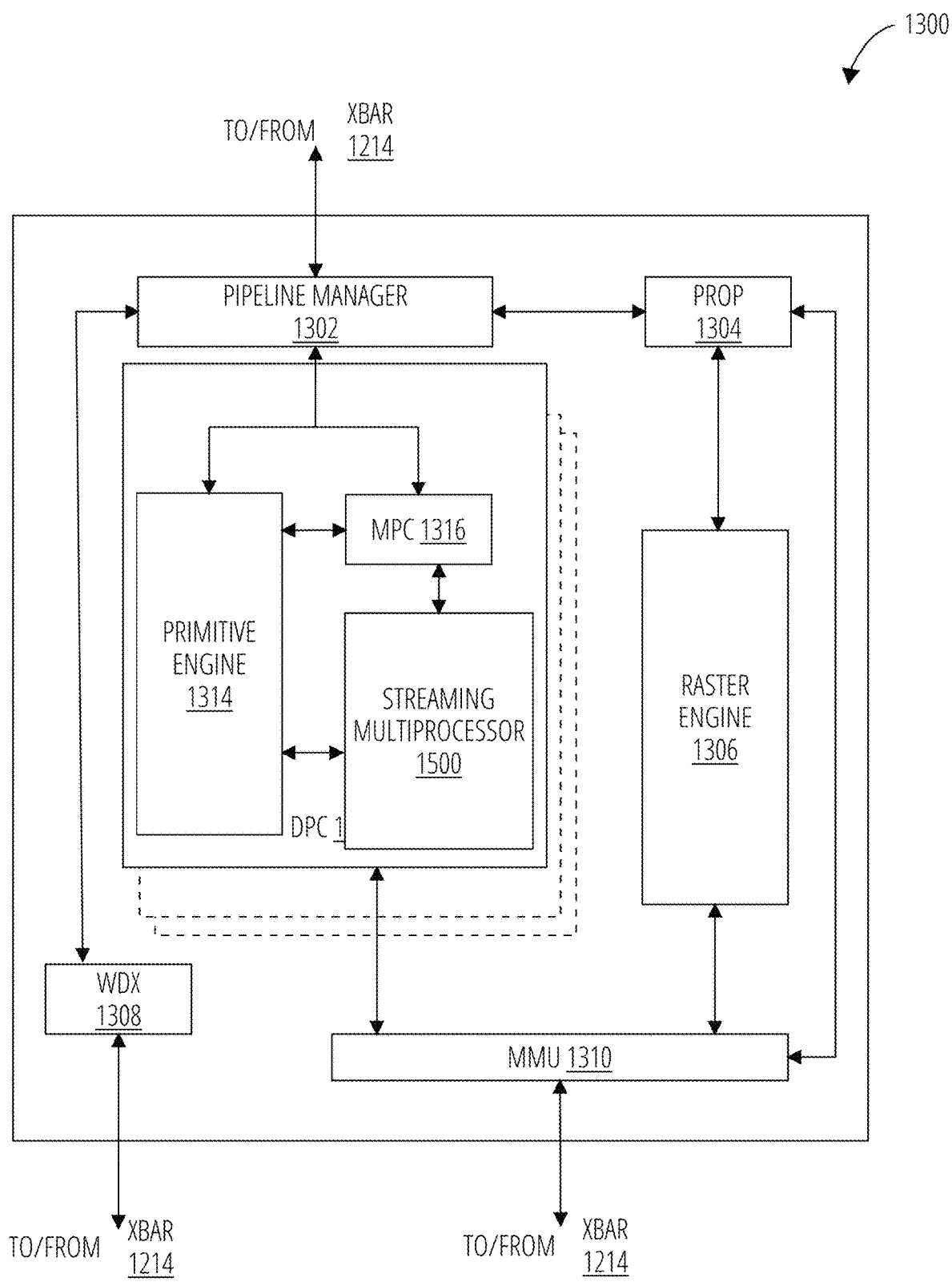
FIG. 13 depicts a general processing cluster 1300 in accordance with one embodiment.

FIG. 13 depicts a general processing cluster 1300 of the parallel processing unit 1202 of FIG. 12, in accordance with an embodiment. As shown in FIG. 13, each general processing cluster 1300 includes a number of hardware units for processing tasks. In an embodiment, each general processing cluster 1300 includes a pipeline manager 1302, a pre-raster operations unit 1304, a raster engine 1306, a work distribution crossbar 1308, a memory management unit 1310, and one or more data processing cluster 1312. It will be appreciated that the general processing cluster 1300 of FIG. 13 may include other hardware units in lieu of or in addition to the units shown in FIG. 13.

In an embodiment, the operation of the general processing cluster 1300 is controlled by the pipeline manager 1302. The pipeline manager 1302 manages the configuration of the one or more data processing cluster 1312 modules for processing tasks allocated to the general processing cluster 1300. In an embodiment, the pipeline manager 1302 may configure at least one of the one or more data processing cluster 1312 modules to implement at least a portion of a graphics rendering pipeline. For example, a data processing cluster 1312 may be configured to execute a vertex shader program on the programmable streaming multiprocessor 1500. The pipeline manager 1302 may also be configured to route packets received from the work distribution unit 1210 to the appropriate logical units within the general processing cluster 1300. For example, some packets may be routed to fixed function hardware units in the pre-raster operations unit 1304 and/or raster engine 1306 while other packets may be routed to the data processing cluster 1312 modules for processing by the primitive engine 1314 or the streaming multiprocessor 1500. In an embodiment, the pipeline manager 1302 may configure at least one of the one or more data processing cluster 1312 modules to implement a neural network model and/or a computing pipeline.

Figure 14:
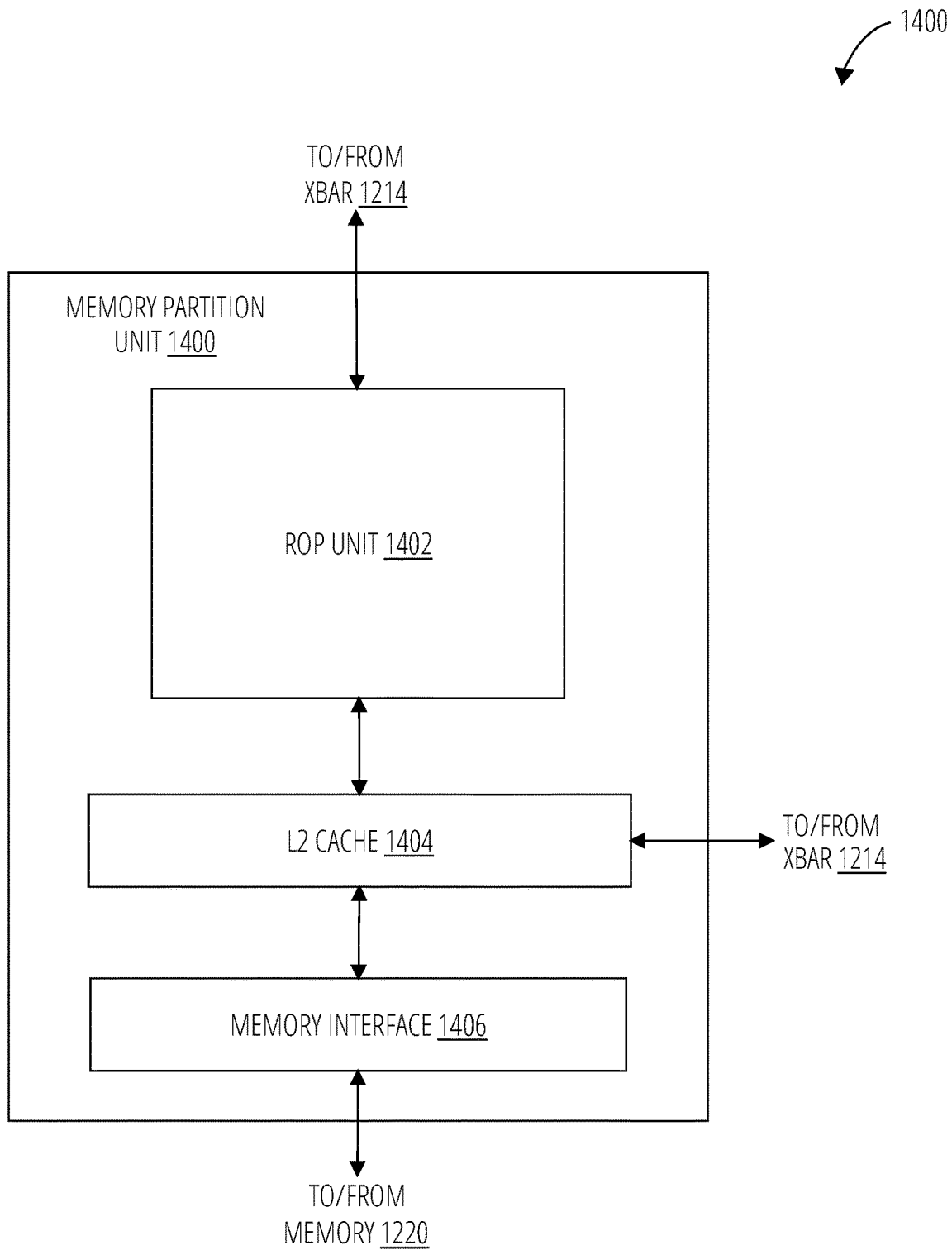
FIG. 14 depicts a memory partition unit 1400 in accordance with one embodiment.

The pre-raster operations unit 1304 is configured to route data generated by the raster engine 1306 and the data processing cluster 1312 modules to a Raster Operations (ROP) unit, described in more detail in conjunction with FIG. 14. The pre-raster operations unit 1304 may also be configured to perform optimizations for color blending, organize pixel data, perform address translations, and the like.

The raster engine 1306 includes a number of fixed function hardware units configured to perform various raster operations. In an embodiment, the raster engine 1306 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x, y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 1306 comprises fragments to be processed, for example, by a fragment shader implemented within a data processing cluster 1312.

Each data processing cluster 1312 included in the general processing cluster 1300 includes an M-pipe controller 1316, a primitive engine 1314, and one or more streaming multiprocessor 1500 modules. The M-pipe controller 1316 controls the operation of the data processing cluster 1312, routing packets received from the pipeline manager 1302 to the appropriate units in the data processing cluster 1312. For example, packets associated with a vertex may be routed to the primitive engine 1314, which is configured to fetch vertex attributes associated with the vertex from the memory 1220. In contrast, packets associated with a shader program may be transmitted to the streaming multiprocessor 1500.

The streaming multiprocessor 1500 comprises a programmable streaming processor that is configured to process tasks represented by a number of threads. Each streaming multiprocessor 1500 is multi-threaded and configured to execute a plurality of threads (e.g., 32 threads) from a particular group of threads concurrently. In an embodiment, the streaming multiprocessor 1500 implements a Single-Instruction, Multiple-Data (SIMD) architecture where each thread in a group of threads (e.g., a warp) is configured to process a different set of data based on the same set of instructions. All threads in the group of threads execute the same instructions. In another embodiment, the streaming multiprocessor 1500 implements a Single-Instruction, Multiple Thread (SIMT) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The streaming multiprocessor 1500 will be described in more detail below in conjunction with FIG. 15.

The memory management unit 1310 provides an interface between the general processing cluster 1300 and the memory partition unit 1400. The memory management unit 1310 may provide translation of virtual addresses into physical addresses, memory protection, and arbitration of memory requests. In an embodiment, the memory management unit 1310 provides one or more translation lookaside buffers (TLBs) for performing translation of virtual addresses into physical addresses in the memory 1220.

FIG. 14 depicts a memory partition unit 1400 of the parallel processing unit 1202 of FIG. 12, in accordance with an embodiment. As shown in FIG. 14, the memory partition unit 1400 includes a raster operations unit 1402, a level two cache 1404, and a memory interface 1406. The memory interface 1406 is coupled to the memory 1220. Memory interface 1406 may implement 32, 64, 128, 1024-bit data buses, or the like, for high-speed data transfer. In an embodiment, the parallel processing unit 1202 incorporates U memory interface 1406 modules, one memory interface 1406 per pair of memory partition unit 1400 modules, where each pair of memory partition unit 1400 modules is connected to a corresponding memory 1220 device. For example, parallel processing unit 1202 may be connected to up to Y memory 1220 devices, such as high bandwidth memory stacks or graphics double-data-rate, version 5, synchronous dynamic random access memory, or other types of persistent storage.

In an embodiment, the memory interface 1406 implements an HBM2 memory interface and Y equals half U. In an embodiment, the HBM2 memory stacks are located on the same physical package as the parallel processing unit 1202, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 1220 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where parallel processing unit 1202 modules process very large datasets and/or run applications for extended periods.

In an embodiment, the parallel processing unit 1202 implements a multi-level memory hierarchy. In an embodiment, the memory partition unit 1400 supports a unified memory to provide a single unified virtual address space for CPU and parallel processing unit 1202 memory, enabling data sharing between virtual memory systems. In an embodiment the frequency of accesses by a parallel processing unit 1202 to memory located on other processors is traced to ensure that memory pages are moved to the physical memory of the parallel processing unit 1202 that is accessing the pages more frequently. In an embodiment, the NVLink 1216 supports address translation services allowing the parallel processing unit 1202 to directly access a CPU's page tables and providing full access to CPU memory by the parallel processing unit 1202.

In an embodiment, copy engines transfer data between multiple parallel processing unit 1202 modules or between parallel processing unit 1202 modules and CPUs. The copy engines can generate page faults for addresses that are not mapped into the page tables. The memory partition unit 1400 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 1220 or other system memory may be fetched by the memory partition unit 1400 and stored in the level two cache 1404, which is located on-chip and is shared between the various general processing cluster 1300 modules. As shown, each memory partition unit 1400 includes a portion of the level two cache 1404 associated with a corresponding memory 1220 device. Lower level caches may then be implemented in various units within the general processing cluster 1300 modules. For example, each of the streaming multiprocessor 1500 modules may implement an L1 cache. The L1 cache is private memory that is dedicated to a particular streaming multiprocessor 1500. Data from the level two cache 1404 may be fetched and stored in each of the L1 caches for processing in the functional units of the streaming multiprocessor 1500 modules. The level two cache 1404 is coupled to the memory interface 1406 and the crossbar 1214.

The raster operations unit 1402 performs graphics raster operations related to pixel color, such as color compression, pixel blending, and the like. The raster operations unit 1402 also implements depth testing in conjunction with the raster engine 1306, receiving a depth for a sample location associated with a pixel fragment from the culling engine of the raster engine 1306. The depth is tested against a corresponding depth in a depth buffer for a sample location associated with the fragment. If the fragment passes the depth test for the sample location, then the raster operations unit 1402 updates the depth buffer and transmits a result of the depth test to the raster engine 1306. It will be appreciated that the number of partition memory partition unit 1400 modules may be different than the number of general processing cluster 1300 modules and, therefore, each raster operations unit 1402 may be coupled to each of the general processing cluster 1300 modules. The raster operations unit 1402 tracks packets received from the different general processing cluster 1300 modules and determines which general processing cluster 1300 that a result generated by the raster operations unit 1402 is routed to through the crossbar 1214. Although the raster operations unit 1402 is included within the memory partition unit 1400 in FIG. 14, in other embodiment, the raster operations unit 1402 may be outside of the memory partition unit 1400. For example, the raster operations unit 1402 may reside in the general processing cluster 1300 or another unit.

Figure 15:
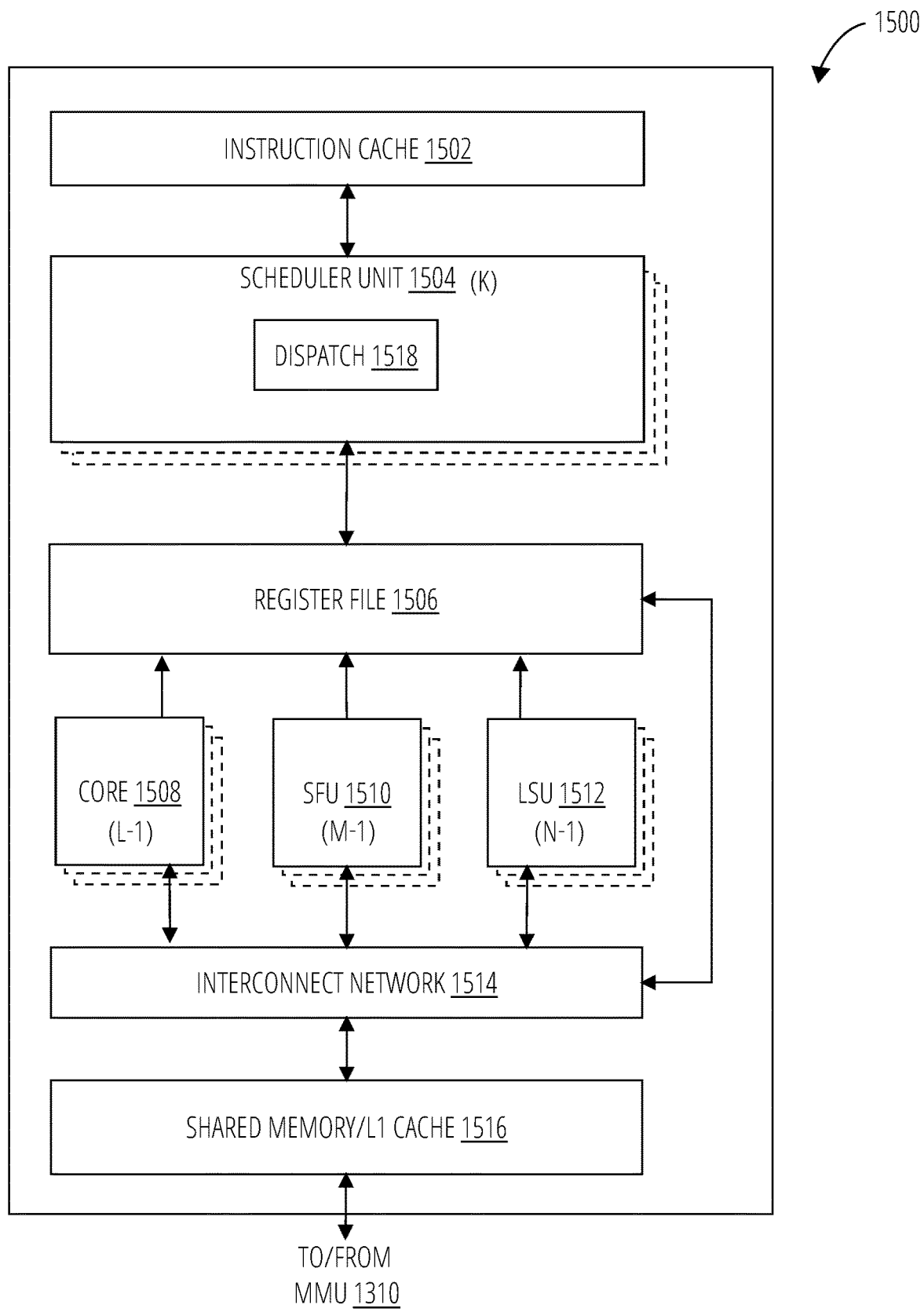
FIG. 15 depicts a streaming multiprocessor 1500 in accordance with one embodiment.

FIG. 15 depicts the streaming multiprocessor 1500 of FIG. 13, in accordance with an embodiment. As shown in FIG. 15, the streaming multiprocessor 1500 includes an instruction cache 1502, one or more scheduler unit 1504 modules (e.g., such as scheduler unit 1208), a register file 1506, one or more processing core 1508 modules, one or more special function unit 1510 modules, one or more load/store unit 1512 modules, an interconnect network 1514, and a shared memory/L1 cache 1516.

As described above, the work distribution unit 1210 dispatches tasks for execution on the general processing cluster 1300 modules of the parallel processing unit 1202. The tasks are allocated to a particular data processing cluster 1312 within a general processing cluster 1300 and, if the task is associated with a shader program, the task may be allocated to a streaming multiprocessor 1500. The scheduler unit 1208 receives the tasks from the work distribution unit 1210 and manages instruction scheduling for one or more thread blocks assigned to the streaming multiprocessor 1500. The scheduler unit 1504 schedules thread blocks for execution as warps of parallel threads, where each thread block is allocated at least one warp. In an embodiment, each warp executes 32 threads. The scheduler unit 1504 may manage a plurality of different thread blocks, allocating the warps to the different thread blocks and then dispatching instructions from the plurality of different cooperative groups to the various functional units (e.g., core 1508 modules, special function unit 1510 modules, and load/store unit 1512 modules) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch 1518 unit is configured within the scheduler unit 1504 to transmit instructions to one or more of the functional units. In one embodiment, the scheduler unit 1504 includes two dispatch 1518 units that enable two different instructions from the same warp to be dispatched during each clock cycle. In alternative embodiments, each scheduler unit 1504 may include a single dispatch 1518 unit or additional dispatch 1518 units.

Each streaming multiprocessor 1500 includes a register file 1506 that provides a set of registers for the functional units of the streaming multiprocessor 1500. In an embodiment, the register file 1506 is divided between each of the functional units such that each functional unit is allocated a dedicated portion of the register file 1506. In another embodiment, the register file 1506 is divided between the different warps being executed by the streaming multiprocessor 1500. The register file 1506 provides temporary storage for operands connected to the data paths of the functional units.

Each streaming multiprocessor 1500 comprises L processing core 1508 modules. In an embodiment, the streaming multiprocessor 1500 includes a large number (e.g., 128, etc.) of distinct processing core 1508 modules. Each core 1508 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the core 1508 modules include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the core 1508 modules. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A'B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each streaming multiprocessor 1500 also comprises M special function unit 1510 modules that perform special functions (e.g., attribute evaluation, reciprocal square root, and the like). In an embodiment, the special function unit 1510 modules may include a tree traversal unit configured to traverse a hierarchical tree data structure. In an embodiment, the special function unit 1510 modules may include texture unit configured to perform texture map filtering operations. In an embodiment, the texture units are configured to load texture maps (e.g., a 2D array of texels) from the memory 1220 and sample the texture maps to produce sampled texture values for use in shader programs executed by the streaming multiprocessor 1500. In an embodiment, the texture maps are stored in the shared memory/L1 cache 1516. The texture units implement texture operations such as filtering operations using mip-maps (e.g., texture maps of varying levels of detail). In an embodiment, each streaming multiprocessor 1500 includes two texture units.

Each streaming multiprocessor 1500 also comprises N load/store unit 1512 modules that implement load and store operations between the shared memory/L1 cache 1516 and the register file 1506. Each streaming multiprocessor 1500 includes an interconnect network 1514 that connects each of the functional units to the register file 1506 and the load/store unit 1512 to the register file 1506 and shared memory/L1 cache 1516. In an embodiment, the interconnect network 1514 is a crossbar that can be configured to connect any of the functional units to any of the registers in the register file 1506 and connect the load/store unit 1512 modules to the register file 1506 and memory locations in shared memory/L1 cache 1516.

The shared memory/L1 cache 1516 is an array of on-chip memory that allows for data storage and communication between the streaming multiprocessor 1500 and the primitive engine 1314 and between threads in the streaming multiprocessor 1500. In an embodiment, the shared memory/L1 cache 1516 comprises 128 KB of storage capacity and is in the path from the streaming multiprocessor 1500 to the memory partition unit 1400. The shared memory/L1 cache 1516 can be used to cache reads and writes. One or more of the shared memory/L1 cache 1516, level two cache 1404, and memory 1220 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 1516 enables the shared memory/L1 cache 1516 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 12, are bypassed, creating a much simpler programming model. In the general purpose parallel computation configuration, the work distribution unit 1210 assigns and distributes blocks of threads directly to the data processing cluster 1312 modules. The threads in a block execute the same program, using a unique thread ID in the calculation to ensure each thread generates unique results, using the streaming multiprocessor 1500 to execute the program and perform calculations, shared memory/L1 cache 1516 to communicate between threads, and the load/store unit 1512 to read and write global memory through the shared memory/L1 cache 1516 and the memory partition unit 1400. When configured for general purpose parallel computation, the streaming multiprocessor 1500 can also write commands that the scheduler unit 1208 can use to launch new work on the data processing cluster 1312 modules.

The parallel processing unit 1202 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the parallel processing unit 1202 is embodied on a single semiconductor substrate. In another embodiment, the parallel processing unit 1202 is included in a system-on-a-chip (SoC) along with one or more other devices such as additional parallel processing unit 1202 modules, the memory 1220, a reduced instruction set computer (RISC) CPU, a memory management unit (MMU), a digital-to-analog converter (DAC), and the like.

In an embodiment, the parallel processing unit 1202 may be included on a graphics card that includes one or more memory devices. The graphics card may be configured to interface with a PCIe slot on a motherboard of a desktop computer. In yet another embodiment, the parallel processing unit 1202 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 16:
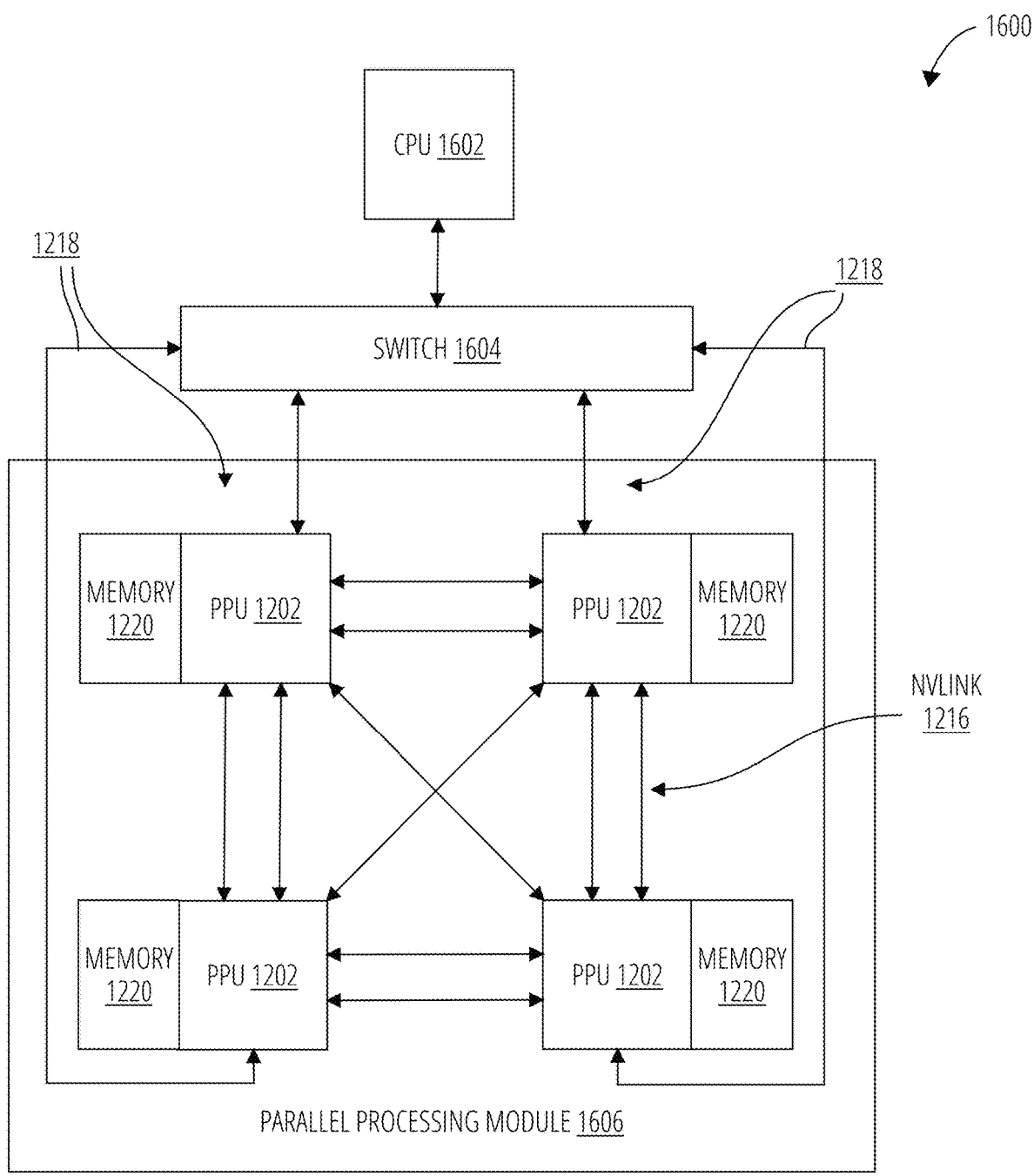
FIG. 16 depicts a processing system 1600 in accordance with one embodiment.

FIG. 16 is a conceptual diagram of a processing system 1600 implemented using the parallel processing unit 1202 of FIG. 12, in accordance with an embodiment. The processing system 1600 includes a central processing unit 1602, switch 1604, and multiple parallel processing unit 1202 modules each and respective memory 1220 modules. The NVLink 1216 provides high-speed communication links between each of the parallel processing unit 1202 modules. Although a particular number of NVLink 1216 and interconnect 1218 connections are depicted in FIG. 16, the number of connections to each parallel processing unit 1202 and the central processing unit 1602 may vary. The switch 1604 interfaces between the interconnect 1218 and the central processing unit 1602. The parallel processing unit 1202 modules, memory 1220 modules, and NVLink 1216 connections may be situated on a single semiconductor platform to form a parallel processing module 1606. In an embodiment, the switch 1604 supports two or more protocols to interface between various different connections and/or links.

In another embodiment (not shown), the NVLink 1216 provides one or more high-speed communication links between each of the parallel processing unit modules (parallel processing unit 1202, parallel processing unit 1202, parallel processing unit 1202, and parallel processing unit 1202) and the central processing unit 1602 and the switch 1604 interfaces between the interconnect 1218 and each of the parallel processing unit modules. The parallel processing unit modules, memory 1220 modules, and interconnect 1218 may be situated on a single semiconductor platform to form a parallel processing module 1606. In yet another embodiment (not shown), the interconnect 1218 provides one or more communication links between each of the parallel processing unit modules and the central processing unit 1602 and the switch 1604 interfaces between each of the parallel processing unit modules using the NVLink 1216 to provide one or more high-speed communication links between the parallel processing unit modules. In another embodiment (not shown), the NVLink 1216 provides one or more high-speed communication links between the parallel processing unit modules and the central processing unit 1602 through the switch 1604. In yet another embodiment (not shown), the interconnect 1218 provides one or more communication links between each of the parallel processing unit modules directly. One or more of the NVLink 1216 high-speed communication links may be implemented as a physical NVLink interconnect or either an on-chip or on-die interconnect using the same protocol as the NVLink 1216.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 1606 may be implemented as a circuit board substrate and each of the parallel processing unit modules and/or memory 1220 modules may be packaged devices. In an embodiment, the central processing unit 1602, switch 1604, and the parallel processing module 1606 are situated on a single semiconductor platform.

In an embodiment, the signaling rate of each NVLink 1216 is 20 to 25 Gigabits/second and each parallel processing unit module includes six NVLink 1216 interfaces (as shown in FIG. 16, five NVLink 1216 interfaces are included for each parallel processing unit module). Each NVLink 1216 provides a data transfer rate of 25 Gigabytes/second in each direction, with six links providing 300 Gigabytes/second. The NVLink 1216 can be used exclusively for PPU-to-PPU communication as shown in FIG. 16, or some combination of PPU-to-PPU and PPU-to-CPU, when the central processing unit 1602 also includes one or more NVLink 1216 interfaces.

In an embodiment, the NVLink 1216 allows direct load/store/atomic access from the central processing unit 1602 to each parallel processing unit module's memory 1220. In an embodiment, the NVLink 1216 supports coherency operations, allowing data read from the memory 1220 modules to be stored in the cache hierarchy of the central processing unit 1602, reducing cache access latency for the central processing unit 1602. In an embodiment, the NVLink 1216 includes support for Address Translation Services (ATS), enabling the parallel processing unit module to directly access page tables within the central processing unit 1602. One or more of the NVLink 1216 may also be configured to operate in a low-power mode.

Figure 17:
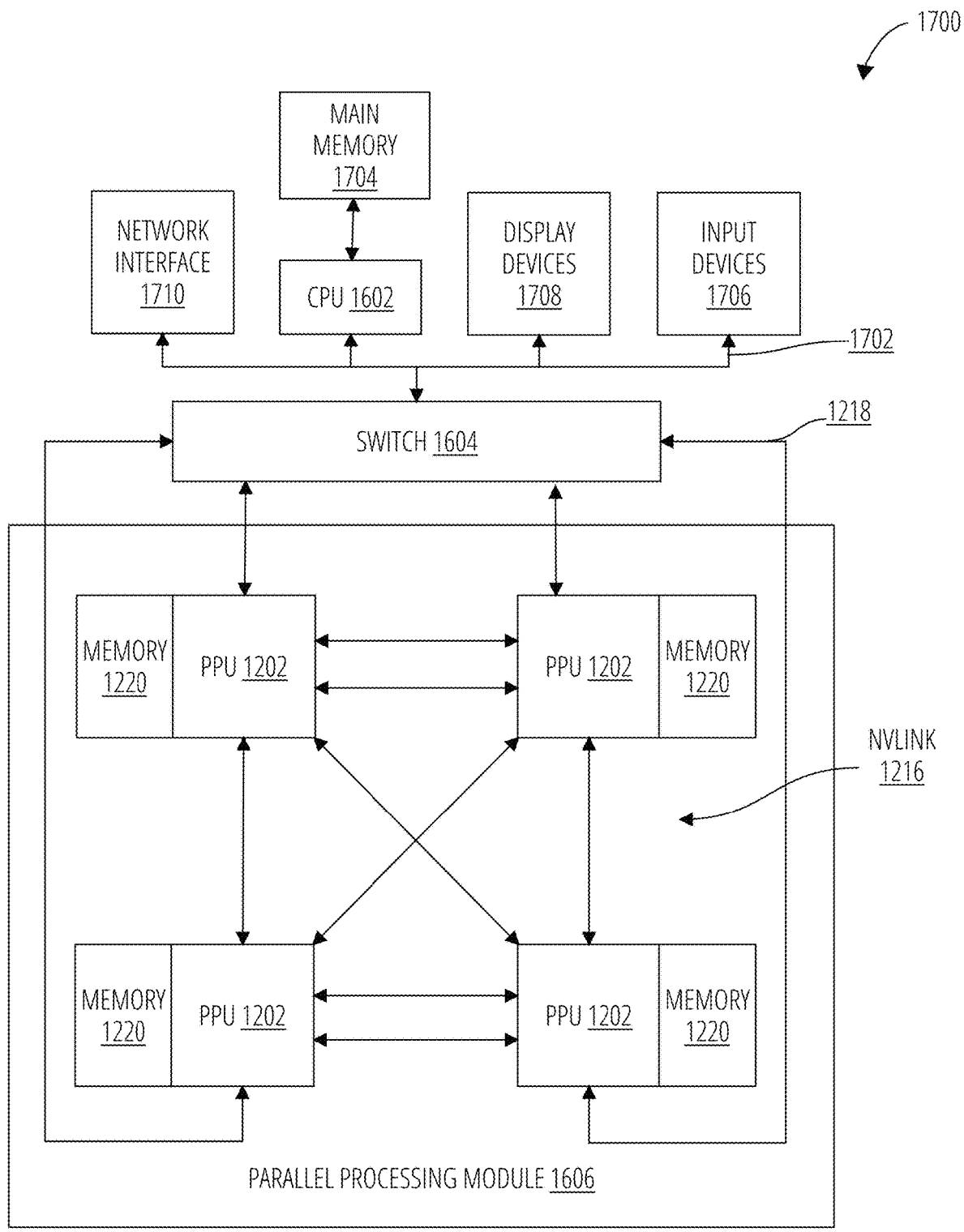
FIG. 17 depicts an exemplary processing system 1700 in accordance with another embodiment.

FIG. 17 depicts an exemplary processing system 1700 in which the various architecture and/or functionality of the various previous embodiments may be implemented. As shown, an exemplary processing system 1700 is provided including at least one central processing unit 1602 that is connected to a communications bus 1702. The communication communications bus 1702 may be implemented using any suitable protocol, such as PCI (Peripheral Component Interconnect), PCI-Express, AGP (Accelerated Graphics Port), HyperTransport, or any other bus or point-to-point communication protocol(s). The exemplary processing system 1700 also includes a main memory 1704. Control logic (software) and data are stored in the main memory 1704 which may take the form of random access memory (RAM).

The exemplary processing system 1700 also includes input devices 1706, the parallel processing module 1606, and display devices 1708, e.g. a conventional CRT (cathode ray tube), LCD (liquid crystal display), LED (light emitting diode), plasma display or the like. User input may be received from the input devices 1706, e.g., keyboard, mouse, touchpad, microphone, and the like. Each of the foregoing modules and/or devices may even be situated on a single semiconductor platform to form the exemplary processing system 1700. Alternately, the various modules may also be situated separately or in various combinations of semiconductor platforms per the desires of the user.

Further, the exemplary processing system 1700 may be coupled to a network (e.g., a telecommunications network, local area network (LAN), wireless network, wide area network (WAN) such as the Internet, peer-to-peer network, cable network, or the like) through a network interface 1710 for communication purposes.

The exemplary processing system 1700 may also include a secondary storage (not shown). The secondary storage includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 1704 and/or the secondary storage. Such computer programs, when executed, enable the exemplary processing system 1700 to perform various functions. The main memory 1704, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the exemplary processing system 1700 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

Figure 18:
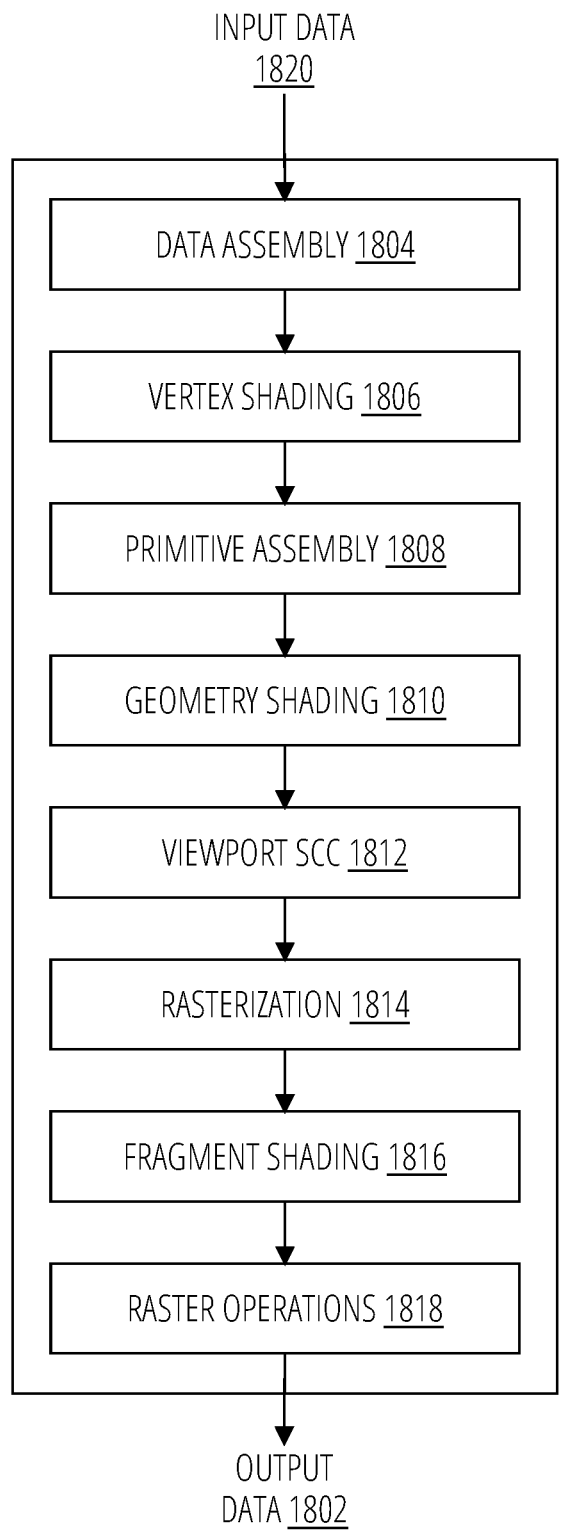
FIG. 18 depicts a graphics processing pipeline 1800 in accordance with one embodiment.

FIG. 18 is a conceptual diagram of a graphics processing pipeline 1800 implemented by the parallel processing unit 1202 of FIG. 12, in accordance with an embodiment. In an embodiment, the parallel processing unit 1202 comprises a graphics processing unit (GPU). The parallel processing unit 1202 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The parallel processing unit 1202 can be configured to process the graphics primitives to generate a frame buffer (e.g., pixel data for each of the pixels of the display).

An application writes model data for a scene (e.g., a collection of vertices and attributes) to a memory such as a system memory or memory 1220. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the streaming multiprocessor 1500 modules of the parallel processing unit 1202 including one or more of a vertex shader, hull shader, domain shader, geometry shader, and a pixel shader. For example, one or more of the streaming multiprocessor 1500 modules may be configured to execute a vertex shader program that processes a number of vertices defined by the model data. In an embodiment, the different streaming multiprocessor 1500 modules may be configured to execute different shader programs concurrently. For example, a first subset of streaming multiprocessor 1500 modules may be configured to execute a vertex shader program while a second subset of streaming multiprocessor 1500 modules may be configured to execute a pixel shader program. The first subset of streaming multiprocessor 1500 modules processes vertex data to produce processed vertex data and writes the processed vertex data to the level two cache 1404 and/or the memory 1220. After the processed vertex data is rasterized (e.g., transformed from three-dimensional data into two-dimensional data in screen space) to produce fragment data, the second subset of streaming multiprocessor 1500 modules executes a pixel shader to produce processed fragment data, which is then blended with other processed fragment data and written to the frame buffer in memory 1220. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

The graphics processing pipeline 1800 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 1800 receives input data 601 that is transmitted from one stage to the next stage of the graphics processing pipeline 1800 to generate output data 1802. In an embodiment, the graphics processing pipeline 1800 may represent a graphics processing pipeline defined by the OpenGL® API. As an option, the graphics processing pipeline 1800 may be implemented in the context of the functionality and architecture of the previous Figures and/or any subsequent Figure(s).

As shown in FIG. 18, the graphics processing pipeline 1800 comprises a pipeline architecture that includes a number of stages. The stages include, but are not limited to, a data assembly 1804 stage, a vertex shading 1806 stage, a primitive assembly 1808 stage, a geometry shading 1810 stage, a viewport SCC 1812 stage, a rasterization 1814 stage, a fragment shading 1816 stage, and a raster operations 1818 stage. In an embodiment, the input data 1820 comprises commands that configure the processing units to implement the stages of the graphics processing pipeline 1800 and geometric primitives (e.g., points, lines, triangles, quads, triangle strips or fans, etc.) to be processed by the stages. The output data 1802 may comprise pixel data (e.g., color data) that is copied into a frame buffer or other type of surface data structure in a memory.

The data assembly 1804 stage receives the input data 1820 that specifies vertex data for high-order surfaces, primitives, or the like. The data assembly 1804 stage collects the vertex data in a temporary storage or queue, such as by receiving a command from the host processor that includes a pointer to a buffer in memory and reading the vertex data from the buffer. The vertex data is then transmitted to the vertex shading 1806 stage for processing.

The vertex shading 1806 stage processes vertex data by performing a set of operations (e.g., a vertex shader or a program) once for each of the vertices. Vertices may be, e.g., specified as a 4-coordinate vector (e.g., <x, y, z, w>) associated with one or more vertex attributes (e.g., color, texture coordinates, surface normal, etc.). The vertex shading 1806 stage may manipulate individual vertex attributes such as position, color, texture coordinates, and the like. In other words, the vertex shading 1806 stage performs operations on the vertex coordinates or other vertex attributes associated with a vertex. Such operations commonly including lighting operations (e.g., modifying color attributes for a vertex) and transformation operations (e.g., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading 1806 stage generates transformed vertex data that is transmitted to the primitive assembly 1808 stage.

The primitive assembly 1808 stage collects vertices output by the vertex shading 1806 stage and groups the vertices into geometric primitives for processing by the geometry shading 1810 stage. For example, the primitive assembly 1808 stage may be configured to group every three consecutive vertices as a geometric primitive (e.g., a triangle) for transmission to the geometry shading 1810 stage. In some embodiments, specific vertices may be reused for consecutive geometric primitives (e.g., two consecutive triangles in a triangle strip may share two vertices). The primitive assembly 1808 stage transmits geometric primitives (e.g., a collection of associated vertices) to the geometry shading 1810 stage.

The geometry shading 1810 stage processes geometric primitives by performing a set of operations (e.g., a geometry shader or program) on the geometric primitives. Tessellation operations may generate one or more geometric primitives from each geometric primitive. In other words, the geometry shading 1810 stage may subdivide each geometric primitive into a finer mesh of two or more geometric primitives for processing by the rest of the graphics processing pipeline 1800. The geometry shading 1810 stage transmits geometric primitives to the viewport SCC 1812 stage.

In an embodiment, the graphics processing pipeline 1800 may operate within a streaming multiprocessor and the vertex shading 1806 stage, the primitive assembly 1808 stage, the geometry shading 1810 stage, the fragment shading 1816 stage, and/or hardware/software associated therewith, may sequentially perform processing operations. Once the sequential processing operations are complete, in an embodiment, the viewport SCC 1812 stage may utilize the data. In an embodiment, primitive data processed by one or more of the stages in the graphics processing pipeline 1800 may be written to a cache (e.g. L1 cache, a vertex cache, etc.). In this case, in an embodiment, the viewport SCC 1812 stage may access the data in the cache. In an embodiment, the viewport SCC 1812 stage and the rasterization 1814 stage are implemented as fixed function circuitry.

The viewport SCC 1812 stage performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (e.g., discarded) because the geometric primitive will not contribute to the final rendered scene. Any geometric primitive that is partially inside the viewing frustum and partially outside the viewing frustum may be clipped (e.g., transformed into a new geometric primitive that is enclosed within the viewing frustum. Furthermore, geometric primitives may each be scaled based on a depth of the viewing frustum. All potentially visible geometric primitives are then transmitted to the rasterization 1814 stage.

The rasterization 1814 stage converts the 3D geometric primitives into 2D fragments (e.g. capable of being utilized for display, etc.). The rasterization 1814 stage may be configured to utilize the vertices of the geometric primitives to setup a set of plane equations from which various attributes can be interpolated. The rasterization 1814 stage may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization 1814 stage generates fragment data (e.g., interpolated vertex attributes associated with a particular sample location for each covered pixel) that are transmitted to the fragment shading 1816 stage.

The fragment shading 1816 stage processes fragment data by performing a set of operations (e.g., a fragment shader or a program) on each of the fragments. The fragment shading 1816 stage may generate pixel data (e.g., color values) for the fragment such as by performing lighting operations or sampling texture maps using interpolated texture coordinates for the fragment. The fragment shading 1816 stage generates pixel data that is transmitted to the raster operations 1818 stage.

The raster operations 1818 stage may perform various operations on the pixel data such as performing alpha tests, stencil tests, and blending the pixel data with other pixel data corresponding to other fragments associated with the pixel. When the raster operations 1818 stage has finished processing the pixel data (e.g., the output data 1802), the pixel data may be written to a render target such as a frame buffer, a color buffer, or the like.

It will be appreciated that one or more additional stages may be included in the graphics processing pipeline 1800 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading 1810 stage). Other types of graphics processing pipelines are contemplated as being within the scope of the present disclosure. Furthermore, any of the stages of the graphics processing pipeline 1800 may be implemented by one or more dedicated hardware units within a graphics processor such as parallel processing unit 1202. Other stages of the graphics processing pipeline 1800 may be implemented by programmable hardware units such as the streaming multiprocessor 1500 of the parallel processing unit 1202.

The graphics processing pipeline 1800 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the parallel processing unit 1202. The API provides an abstraction for a programmer that lets a programmer utilize specialized graphics hardware, such as the parallel processing unit 1202, to generate the graphical data without requiring the programmer to utilize the specific instruction set for the parallel processing unit 1202. The application may include an API call that is routed to the device driver for the parallel processing unit 1202. The device driver interprets the API call and performs various operations to respond to the API call. In some instances, the device driver may perform operations by executing instructions on the CPU. In other instances, the device driver may perform operations, at least in part, by launching operations on the parallel processing unit 1202 utilizing an input/output interface between the CPU and the parallel processing unit 1202. In an embodiment, the device driver is configured to implement the graphics processing pipeline 1800 utilizing the hardware of the parallel processing unit 1202.

Various programs may be executed within the parallel processing unit 1202 in order to implement the various stages of the graphics processing pipeline 1800. For example, the device driver may launch a kernel on the parallel processing unit 1202 to perform the vertex shading 1806 stage on one streaming multiprocessor 1500 (or multiple streaming multiprocessor 1500 modules). The device driver (or the initial kernel executed by the parallel processing unit 1202) may also launch other kernels on the parallel processing unit 1202 to perform other stages of the graphics processing pipeline 1800, such as the geometry shading 1810 stage and the fragment shading 1816 stage. In addition, some of the stages of the graphics processing pipeline 1800 may be implemented on fixed unit hardware such as a rasterizer or a data assembler implemented within the parallel processing unit 1202. It will be appreciated that results from one kernel may be processed by one or more intervening fixed function hardware units before being processed by a subsequent kernel on a streaming multiprocessor 1500.

Figure 19:
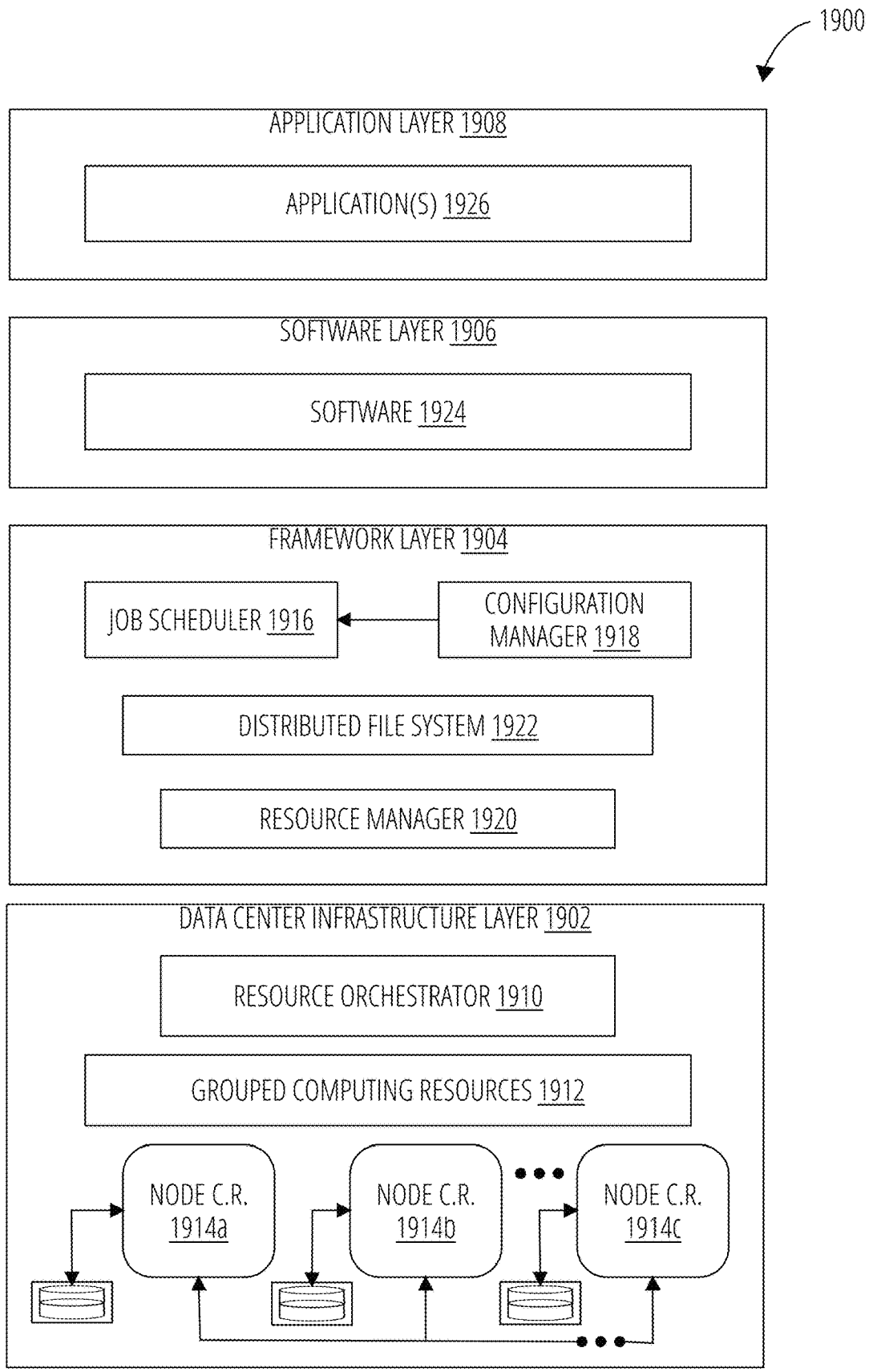
FIG. 19 depicts a data center 1900 in accordance with one embodiment.

FIG. 19 depicts an exemplary data center 1900, in accordance with at least one embodiment. In at least one embodiment, data center 1900 includes, without limitation, a data center infrastructure layer 1902, a framework layer 1904, software layer 1906, and an application layer 1908.

In at least one embodiment, as depicted in FIG. 19, data center infrastructure layer 1902 may include a resource orchestrator 1910, grouped computing resources 1912, and node computing resources ("node C.R.s") Node C.R. 1914*a*, Node C.R. 1914*b*, Node C.R. 1914*c*, . . . node C.R. N), where "N" represents any whole, positive integer. In at least one embodiment, node C.R.s may include, but are not limited to, any number of central processing units ("CPUs") or other processors (including accelerators, field programmable gate arrays ("FPGAs"), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s may be a server having one or more of above-mentioned computing resources.

The node C.R.s may communicate internally and/or between one another utilizing embodiments of the CDR circuits disclosed herein.

In at least one embodiment, grouped computing resources 1912 may include separate groupings of node C.R.s housed within one or more racks (not shown), or many racks housed in data centers at various geographical locations (also not shown). Separate groupings of node C.R.s within grouped computing resources 1912 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 1910 may configure or otherwise control one or more node C.R.s and/or grouped computing resources 1912. In at least one embodiment, resource orchestrator 1910 may include a software design infrastructure ("SDI") management entity for data center 1900. In at least one embodiment, resource orchestrator 1910 may include hardware, software or some combination thereof.

In at least one embodiment, as depicted in FIG. 19, framework layer 1904 includes, without limitation, a job scheduler 1916, a configuration manager 1918, a resource manager 1920, and a distributed file system 1922. In at least one embodiment, framework layer 1904 may include a framework to support software 1924 of software layer 1906 and/or one or more application(s) 1926 of application layer 220. In at least one embodiment, software 1924 or application(s) 1926 may respectively include web-based service software or applications, such as those provided by Amazon Web Services, Google Cloud and Microsoft Azure. In at least one embodiment, framework layer 1904 may be, but is not limited to, a type of free and open-source software web application framework such as Apache Spark™ (hereinafter "Spark") that may utilize a distributed file system 1922 for large-scale data processing (e.g., "big data"). In at least one embodiment, job scheduler 1916 may include a Spark driver to facilitate scheduling of workloads supported by various layers of data center 1900. In at least one embodiment, configuration manager 1918 may be capable of configuring different layers such as software layer 1906 and framework layer 1904, including Spark and distributed file system 1922 for supporting large-scale data processing. In at least one embodiment, resource manager 1920 may be capable of managing clustered or grouped computing resources mapped to or allocated for support of distributed file system 1922 and distributed file system 1922. In at least one embodiment, clustered or grouped computing resources may include grouped computing resources 1912 at data center infrastructure layer 1902. In at least one embodiment, resource manager 1920 may coordinate with resource orchestrator 1910 to manage these mapped or allocated computing resources.

In at least one embodiment, software 1924 included in software layer 1906 may include software used by at least portions of node C.R.s, grouped computing resources 1912, and/or distributed file system 1922 of framework layer 1904. One or more types of software may include, but are not limited to, Internet web page search software, e-mail virus scan software, database software, and streaming video content software.

In at least one embodiment, application(s) 1926 included in application layer 1908 may include one or more types of applications used by at least portions of node C.R.s, grouped computing resources 1912, and/or distributed file system 1922 of framework layer 1904. In at least one or more types of applications may include, without limitation, CUDA applications, 5G network applications, artificial intelligence application, data center applications, and/or variations thereof.

In at least one embodiment, any of configuration manager 1918, resource manager 1920, and resource orchestrator 1910 may implement any number and type of self-modifying actions based on any amount and type of data acquired in any technically feasible fashion. In at least one embodiment, self-modifying actions may relieve a data center operator of data center 1900 from making possibly bad configuration decisions and possibly avoiding underutilized and/or poor performing portions of a data center.

LISTING OF DRAWING ELEMENTS 100 transceiver
102 transmitter
104 receiver
106 channel
108 transmitted data
110 received data
200 receiver
202 receiver input
204 continuous time linear equalizer
206 feed forward equalizer
208 decision feedback equalizer
210 data detector
212 clock and data recovery circuit
214 received data
300 receiver with partial response equalization
302 receiver input
304 continuous time linear equalizer
306 receiver feed-forward equalizer
308 decision feedback equalizer
310 data detector
312 clock and data recovery circuit
314 decoder
316 decoded data
318 e(n), y(n), ŷ(n)
400 clock and data recovery system
402 phase calculator
404 digital loop filter
406 clocking element
408 data detector output
410 recovered clock
500 clock and data recovery system
502 accumulated phase or gradient calculator
800 clock and data recovery system
802 data detector
804 illegal data detector 806 window/threshold logic
808 accumulated phase detector
810 digital loop filter
812 clocking element
814 (T, W, Km)
816 recovered clock
900 clock and data recovery system
902 data detector
904 illegal data detector
906 window/threshold logic
908 accumulated phase detector
910 digital loop filter
912 clocking element
914 (T, W, Km)
916 recovered clock
1000 voltage-controlled oscillator based clock data recovery
1002 DCO
1004 phase detector
1006 latch
1008 Icp, p
1010 Icp, i
1012 integral path
1100 voltage-controlled oscillator based clock data recovery
1102 phase detector
1104 latch
1106 timing estimate injector
1108 OR gate bank
1110 DCO
1112 Icp, p
1114 Icp, i
1116 integral path
1202 parallel processing unit
1204 I/O unit
1206 front-end unit
1208 scheduler unit
1210 work distribution unit
1212 hub
1214 crossbar
1216 NVLink
1218 interconnect
1220 memory
1300 general processing cluster
1302 pipeline manager
1304 pre-raster operations unit
1306 raster engine
1308 work distribution crossbar
1310 memory management unit
1312 data processing cluster
1314 primitive engine
1316 M-pipe controller
1400 memory partition unit
1402 raster operations unit
1404 level two cache
1406 memory interface
1500 streaming multiprocessor
1502 instruction cache
1504 scheduler unit
1506 register file
1508 core
1510 special function unit
1512 load/store unit
1514 interconnect network
1516 shared memory/L1 cache
1518 dispatch
1600 processing system
1602 central processing unit
1604 switch
1606 parallel processing module
1700 exemplary processing system
1702 communications bus
1704 main memory
1706 input devices
1708 display devices
1710 network interface
1800 graphics processing pipeline
1802 output data
1804 data assembly
1806 vertex shading
1808 primitive assembly
1810 geometry shading
1812 viewport SCC
1814 rasterization
1816 fragment shading
1818 raster operations
1820 input data
1900 data center
1902 data center infrastructure layer
1904 framework layer
1906 software layer
1908 application layer
1910 resource orchestrator
1912 grouped computing resources
1914a node C.R.
1914b node C.R.
1914c node C.R.
1916 job scheduler
1918 configuration manager
1920 resource manager
1922 distributed file system
1924 software
1926 application(s)

Various functional operations described herein may be implemented in logic that is referred to using a noun or noun phrase reflecting said operation or function. For example, an association operation may be carried out by an "associator" or "correlator". Likewise, switching may be carried out by a "switch", selection by a "selector", and so on. "Logic" refers to machine memory circuits and non-transitory machine readable media comprising machine-executable instructions (software and firmware), and/or circuitry (hardware) which by way of its material and/or material-energy configuration comprises control and/or procedural signals, and/or settings and values (such as resistance, impedance, capacitance, inductance, current/voltage ratings, etc.), that may be applied to influence the operation of a device. Magnetic media, electronic circuits, electrical and optical memory (both volatile and nonvolatile), and firmware are examples of logic. Logic specifically excludes pure signals or software per se (however does not exclude machine memories comprising software and thereby forming configurations of matter).

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "credit distribution circuit configured to distribute credits to a plurality of processor cores" is intended to cover, for example, an integrated circuit that has circuitry that performs this function during operation, even if the integrated circuit in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function after programming.

Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise. For example, in a register file having eight registers, the terms "first register" and "second register" can be used to refer to any two of the eight registers, and not, for example, just logical registers 0 and 1.

When used in the claims, the term "or" is used as an inclusive or and not as an exclusive or. For example, the phrase "at least one of x, y, or z" means any one of x, y, and z, as well as any combination thereof.

As used herein, a recitation of "and/or" with respect to two or more elements should be interpreted to mean only one element, or a combination of elements. For example, "element A, element B, and/or element C" may include only element A, only element B, only element C, element A and element B, element A and element C, element B and element C, or elements A, B, and C. In addition, "at least one of element A or element B" may include at least one of element A, at least one of element B, or at least one of element A and at least one of element B. Further, "at least one of element A and element B" may include at least one of element A, at least one of element B, or at least one of element A and at least one of element B.

The subject matter of the present disclosure is described with specificity herein to meet statutory requirements. However, the description itself is not intended to limit the scope of this disclosure. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Having thus described illustrative embodiments in detail, it will be apparent that modifications and variations are possible without departing from the scope of the invention as claimed. The scope of inventive subject matter is not limited to the depicted embodiments but is rather set forth in the following Claims.

What is claimed is:

1. A clock recovery circuit comprising:
    a detector configured to receive data and detect illegal decisions;
    a phase detector to form an accumulated phase gradient; and
    logic to:
        determine a number of occurrence of the illegal decisions;
        on condition that the number of illegal decisions exceeds a pre-defend number over a pre-defined time period, add to the accumulated phase gradient a phase increment having a sign of the accumulated phase gradient; and
        apply the phase increment to a clock circuit.

2. The clock recovery circuit of claim 1, further comprising:
    a digital loop filter to receive the phase increment and apply it to the clock circuit.

3. The clock recovery circuit of claim 2, wherein the phase increment is applied to a timing estimate at one of an input an an output of the loop filter.

4. The clock recovery circuit of claim 2, wherein the phase increment is applied at an intermediate node of the loop filter.

5. The clock recovery circuit of claim 1, wherein the clock circuit is a phase interpolator.

6. The clock recovery circuit of claim 1, wherein the clock circuit is a digital controlled oscillator.

7. The clock recovery circuit of claim 1, wherein the clock recovery circuit is coupled to a first order partial response (PR1) system.

8. The clock recovery circuit of claim 1, wherein the clock recovery circuit is coupled to a second order partial response (PR2) system.

9. The clock recovery circuit of claim 1, wherein the phase increment is a programmable value.

10. A receiver for four-level pulse-amplitude modulated (PAM-4) signals, the receiver comprising:
    logic to receive PAM-4 encoded data and detect illegal decisions;
    a clocking element; and
    logic to:

determine a number of occurrence of the illegal decisions;

on condition that the number of illegal decisions exceeds a pre-defend number, inject a phase increment into the clocking element, the phase increment having a sign of an accumulated phase gradient for the PAM-4 encoded data; and apply the phase increment to the clock element.

11. The receiver of claim 10, further comprising:
a digital loop filter to receive the phase increment and apply it to the clock element.

12. The receiver of claim 11, wherein the phase increment is applied to a timing estimate at one of an input an output of the loop filter.

13. The receiver of claim 11, wherein the phase increment is applied at an intermediate node of the loop filter.

14. The receiver of claim 10, wherein the clock element is a phase interpolator.

15. The receiver of claim 10, wherein the clock element is a digital controlled oscillator.

16. The receiver of claim 10, further comprising a duobinary partial response system.

17. The receiver of claim 10, further comprising a second-order loop filter.

18. The receiver of claim 10, wherein the phase increment is a programmable value.

19. A method comprising:
detecting illegal decisions in a data receiver;
accumulating a phase gradient for the data;
determining a number of occurrence of the illegal decisions;
on condition that the number of illegal decisions exceeds a pre-defend number over a pre-defined time period, adding to the accumulated phase gradient a phase increment having a sign of the accumulated phase gradient; and
applying the phase increment to a clock circuit.

20. The method of claim 19, wherein the receiver comprises a first order partial response (PR1) system.

21. The method of claim 19, wherein the receiver comprises a second order partial response (PR2) system.

* * * * *